US012591235B2

(12) United States Patent
Antonini et al.

(10) Patent No.: US 12,591,235 B2
(45) Date of Patent: Mar. 31, 2026

(54) SYSTEM AND METHOD FOR CONTROLLING UNMANNED AUTONOMOUS VEHICLES

(71) Applicant: Telecom Italia S.p.A., Milan (IT)

(72) Inventors: Roberto Antonini, Turin (IT); Marco Gaspardone, Turin (IT); Mauro Alberto Rossotto, Turin (IT)

(73) Assignee: Telecom Italia S.p.A., Milan (IT)

( * ) Notice: Subject to any disclaimer, the term of this patent is extended or adjusted under 35 U.S.C. 154(b) by 276 days.

(21) Appl. No.: 17/911,900

(22) PCT Filed: Mar. 5, 2021

(86) PCT No.: PCT/EP2021/055568
§ 371 (c)(1),
(2) Date: Sep. 15, 2022

(87) PCT Pub. No.: WO2021/185597
PCT Pub. Date: Sep. 23, 2021

(65) Prior Publication Data
US 2023/0195103 A1      Jun. 22, 2023

(30) Foreign Application Priority Data
Mar. 18, 2020      (IT) ........................ 102020000005707

(51) Int. Cl.
*G06V 20/58*      (2022.01)
*B64U 10/00*      (2023.01)
(Continued)

(52) U.S. Cl.
CPC ........... *G05D 1/0022* (2013.01); *B64U 10/00* (2023.01); *G05D 1/0027* (2013.01); *G08G 5/26* (2025.01);
(Continued)

(58) Field of Classification Search
CPC .... G05D 1/0022; G05D 1/0027; G05D 1/226; G05D 1/69; G05D 2109/254;
(Continued)

(56) References Cited

U.S. PATENT DOCUMENTS

2016/0363929 A1* 12/2016 Clark ................... G05D 1/0022
2017/0013478 A1    1/2017 Singh et al.
(Continued)

FOREIGN PATENT DOCUMENTS

EP            1847896 A1    10/2007

OTHER PUBLICATIONS

May 2, 20210—(WO) ISR and Written Opinion of the ISA—App PCT/EP2021/055568.
Sep. 2, 20237—(EP) Office Action—EP App 21711462.8.

*Primary Examiner* — Aniss Chad
*Assistant Examiner* — Hussam Aldeen Alzateemeh
(74) *Attorney, Agent, or Firm* — Banner & Witcoff, Ltd.

(57)                ABSTRACT

A system is provided, comprising an automatic drive system connected to a communication network and configured to drive flying unmanned autonomous vehicles by exchanging messages and commands with the unmanned autonomous vehicles exploiting a communication link between the communication network and unmanned autonomous vehicles. The system further comprises a terminator network different from the communication network, the terminator network comprising terminator units deployed across a geographic area, each terminator unit configured to exchange messages and commands with unmanned autonomous vehicles located in a respective terminator unit coverage area within the geographic area through a first additional communication link, each terminator unit configured to send flight termination commands to selected unmanned autonomous vehicles through the first additional communication link, and each
(Continued)

unmanned autonomous vehicle configured to execute a flight termination procedure in response to the reception of the termination command, the first additional communication link being different from the communication link.

17 Claims, 17 Drawing Sheets

(51) Int. Cl.
| | |
|---|---|
| *G05D 1/00* | (2006.01) |
| *G08G 5/26* | (2025.01) |
| *G08G 5/55* | (2025.01) |
| *G08G 5/57* | (2025.01) |
| *G08G 5/58* | (2025.01) |

(52) U.S. Cl.
CPC ................. *G08G 5/55* (2025.01); *G08G 5/57* (2025.01); *G08G 5/58* (2025.01); *B64U 2201/10* (2023.01)

(58) Field of Classification Search
CPC .. B64U 10/00; B64U 2201/10; G08G 5/0013; G08G 5/0056; G08G 5/0069; G08G 5/0026; G08G 5/0052; H04L 12/12; H04W 4/44
USPC ........................................................... 701/2
See application file for complete search history.

(56) References Cited

U.S. PATENT DOCUMENTS

| | | | |
|---|---|---|---|
| 2018/0068567 A1* | 3/2018 | Gong | ................... B64C 39/024 |
| 2018/0375568 A1 | 12/2018 | De Rosa et al. | |

\* cited by examiner

420

509

510

Y

N

511

512

END

SYSTEM AND METHOD FOR CONTROLLING UNMANNED AUTONOMOUS VEHICLES

BACKGROUND OF THE INVENTION

Field of the Invention

The present invention relates to a system and method for controlling unmanned autonomous vehicles.

Overview of the Related Art

With the term of unmanned autonomous vehicle, it is herein intended any kind of vehicle capable of moving (e.g., flying over the air, navigating over the sea, traveling over the ground) without a human pilot, that is configured and designed to move in an automatic way by means of an automatic drive system. Examples of unmanned autonomous vehicles may comprise, among the others, flying drones and Unmanned Aerial Vehicles (UAVs).

The automatic drive system of an unmanned autonomous vehicle may be in turn either directly on-board, or located in a remote-control station. In case the automatic drive system is remote with respect to the unmanned autonomous vehicle, the automatic drive system is configured to communicate with the unmanned autonomous vehicle, for example for sending control commands, through a wireless communication link. Examples of said wireless communication link used for the communication between the automatic drive system and the unmanned autonomous vehicle may comprise a cellular communication link established through a mobile communication network (e.g., a 3G, 4G or 5G mobile communication network), and a Wi-Fi communication link.

The ever-increasing spreading of unmanned autonomous vehicles, which are being exploited for performing several tasks in different fields for different applications, highlighted the need of facing several safety issues. In this regard, countries started to set up safety regulations which provide rules and requirements to be fulfilled in order to guarantee a sufficient degree of safety.

A very important safety issue relates to the so-called "flight termination" procedure. By flight termination procedure it is intended an emergency procedure which provides for ending the flight of a flying unmanned autonomous vehicle in a safe and controlled manner, so as to reduce as much as possible potential impact damages. The flight termination procedure should be efficiently and promptly carried out as soon as specific conditions are verified, such as for example criticalities involving the unmanned autonomous vehicle itself and/or the environment crossed or to be crossed by the unmanned autonomous vehicle.

In order to be effective, the flight termination procedure for an unmanned autonomous vehicle should be capable of being triggered (also) in an automatic way by the automatic drive system of the unmanned autonomous vehicle. In case the automatic drive system is remote with respect to the unmanned autonomous vehicle, a flight termination triggering command has to be (e.g., automatically) sent by the automatic drive system.

A possible solution may provide for having the automatic drive system send the flight termination triggering command through the same wireless communication link normally used for sending control commands.

EP 1847896A1 discloses a method of creating a termination map for an aircraft over an area of interest indicating the lowest allowable flight altitude to achieve a glide path of a vehicle to a termination point of the area of interest and a map of vectors of the area of interest indicating direction towards a termination point to control an unmanned vehicle.

SUMMARY OF THE INVENTION

The Applicant has found that the solutions known in the art are not satisfactory because they are not capable of guaranteeing the triggering of a flight termination procedure in case the communication link normally used for sending control commands is malfunctioning or not operative.

In view of the above, the Applicant has devised an improved system and method for guaranteeing a safer triggering of a flight termination procedure for an unmanned autonomous vehicle, even when the communication link normally used for sending control commands to the unmanned autonomous vehicle is malfunctioning or not operative.

An aspect of the present invention relates to a system, comprising an automatic drive system connected to a communication network and configured to drive flying unmanned autonomous vehicles by exchanging messages and commands with the unmanned autonomous vehicles exploiting a communication link between the communication network and unmanned autonomous vehicles.

According to an embodiment of the present invention, the system comprises a terminator network different from the communication network.

According to an embodiment of the present invention, the terminator network comprises terminator units deployed across a geographic area.

According to an embodiment of the present invention, each terminator unit is configured to exchange messages and commands with unmanned autonomous vehicles located in a respective terminator unit coverage area within the geographic area through a first additional communication link.

According to an embodiment of the present invention, each terminator unit is configured to send flight termination commands to selected unmanned autonomous vehicles through the first additional communication link.

According to an embodiment of the present invention, each unmanned autonomous vehicle is configured to carry out a flight termination procedure in response to the reception of the termination command.

According to an embodiment of the present invention, the first additional communication link is different from the communication link.

According to an embodiment of the present invention, the terminator units are configured to exchange messages and commands with the communication network through a second additional communication link different from the communication link.

According to an embodiment of the present invention, the system further comprises at least one router module in communication relationship with the automatic drive system and the terminator units.

According to an embodiment of the present invention, the second additional communication link is implemented at least by the at least one router module.

According to an embodiment of the present invention, the terminator network is configured to associate unmanned autonomous vehicles to terminator units.

According to an embodiment of the present invention, each terminator unit is configured to send flight termination commands to selected unmanned autonomous vehicles within its coverage area which are associated to the terminator unit.

According to an embodiment of the present invention, the terminator network is configured to associate an unmanned autonomous vehicle to a terminator unit conditioned to the reception by the terminator unit of an acknowledge message generated by the unmanned autonomous vehicle in response to the transmission by the terminator unit of an interrogation message corresponding to the unmanned autonomous vehicle.

According to an embodiment of the present invention, the acknowledge message and the interrogation message are exchanged through the first additional communication link.

According to an embodiment of the present invention, the flight termination commands are generated by at least one between the automatic drive system and a user equipment connected to the communication network, According to an embodiment of the present invention, the flight termination commands are forwarded to selected terminator units exploiting the second additional communication channel.

According to an embodiment of the present invention, said communication link comprises a cellular communication link or a Wi-Fi communication link.

According to an embodiment of the present invention, the first additional communication link is a wireless communication link using frequencies, technologies and/or transmission parameters different from the communication link.

According to an embodiment of the present invention, the second additional communication link comprises a wireless communication link or a wired communication link, using frequencies, technologies and/or transmission parameters different from the first communication link.

According to an embodiment of the present invention, each terminator unit is configured to switch its operation from:

a reduced power mode, in which the exchange of messages and commands between the terminator unit and unmanned autonomous vehicles through the first additional communication link is not enabled, to an active power mode, in which the exchange of messages and commands between the terminator unit and unmanned autonomous vehicles through the first additional communication link is enabled, upon the reception of a switch-on message.

Another aspect of the present invention relates to a method, comprising:

having an automatic drive system connected to a communication network drive flying unmanned autonomous vehicles by exchanging messages and commands with the unmanned autonomous vehicles exploiting a communication link between the communication network and unmanned autonomous vehicles;

having a terminator unit of a terminator network, different from the communication network and comprising terminator units deployed across a geographic area, exchange messages and commands with unmanned autonomous vehicles located in a respective terminator unit coverage area within the geographic area through a first additional communication link, the exchange messages and commands comprising sending flight termination commands to selected unmanned autonomous vehicles through the first additional communication link;

having an unmanned autonomous vehicle carry out a flight termination procedure in response to the reception of the termination command, wherein:

the first additional communication link being different from the communication link.

According to an embodiment of the present invention, the method further comprises having the terminator units exchange messages and commands with the communication network through a second additional communication link different from the communication link.

According to an embodiment of the present invention, the method further comprises having a terminator unit:

associate unmanned autonomous vehicles thereto, send flight termination commands to selected unmanned autonomous vehicles within its coverage area which are associated to the terminator unit.

According to an embodiment of the present invention, the method further comprises:

having a terminator unit transmit to an unmanned autonomous vehicle an interrogation message corresponding to the unmanned autonomous vehicle through the first additional communication link;

having said unmanned autonomous vehicle generate an acknowledge message in response to said interrogation message;

having the unmanned autonomous vehicle transmit the acknowledge message to the terminator unit through the first additional communication link;

having the terminator unit associate the unmanned autonomous vehicle to the terminator unit conditioned to the reception of the acknowledge message.

According to an embodiment of the present invention, the method further comprises having at least one between the automatic drive system and a user equipment connected to the communication network generate said flight termination commands and forward the generated flight termination commands to selected terminator units exploiting the second additional communication channel.

BRIEF DESCRIPTION OF THE DRAWINGS

These and other features and advantages of the solution according to the present invention will be better understood by reading the following detailed description of an embodiment thereof, provided merely by way of non-limitative example, to be read in conjunction with the attached drawings, wherein.

DETAILED DESCRIPTION

Figure 1:
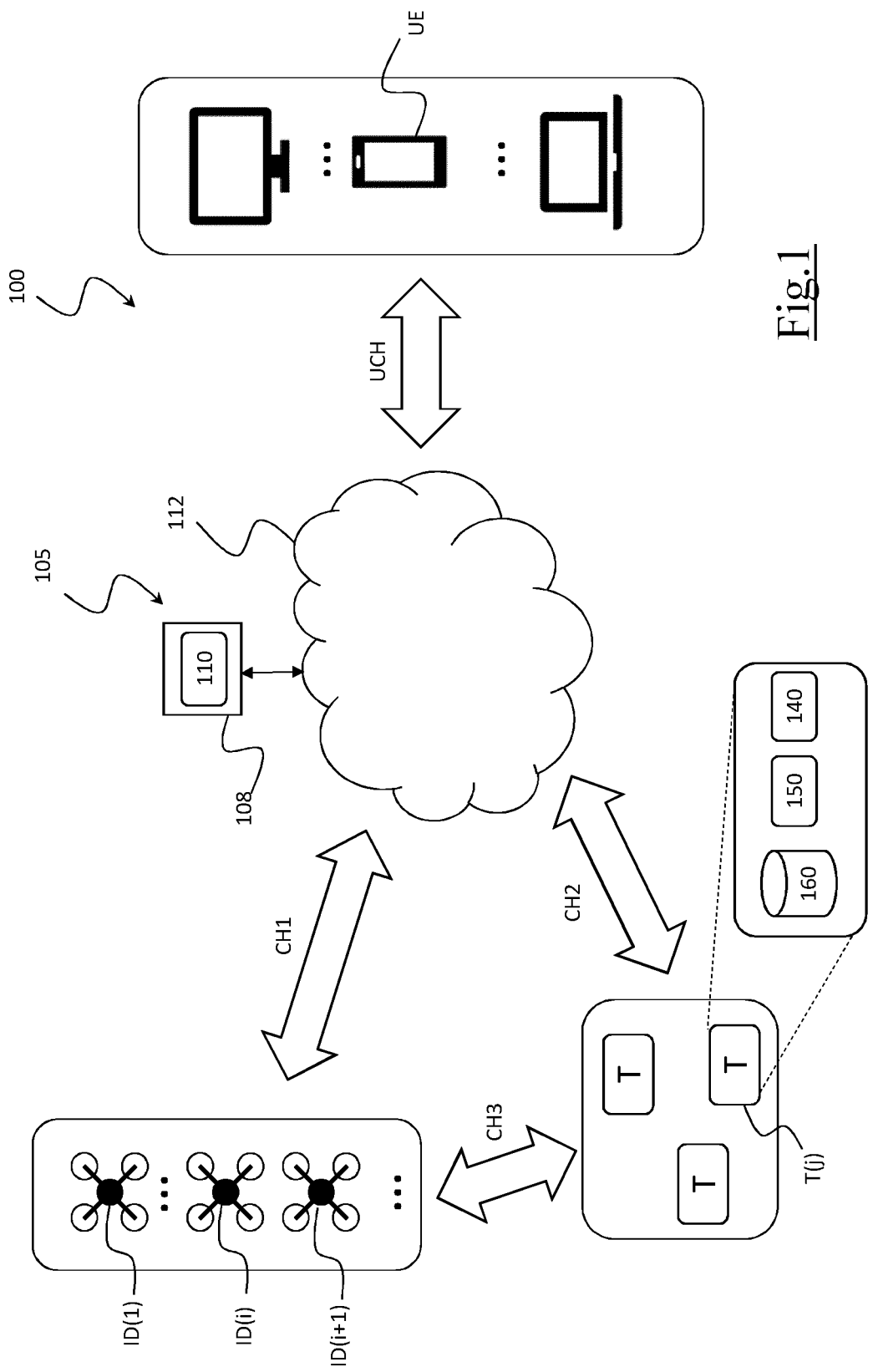
FIG. 1 illustrates in terms of functional modules a scenario in which embodiments of the present invention can be applied.

With reference to the drawings, FIG. 1 illustrates in terms of functional modules a scenario 100 in which embodiments of the present invention can be applied.

It should be noted that the terms 'unit', 'system' or 'module' are herein intended to comprise, but not limited to, hardware, firmware, a combination of hardware and software, software.

For example, a unit, system or module may be, but is not limited to being, a process running on a processor, a processor, an object, an executable, a thread of execution, a program, and/or a computing device.

In other words, a unit, system or module may comprise an application being executed on a computing device and/or the computing device itself.

One or more units, systems or modules may be localized on one computing device and/or distributed between two or more computing devices.

Units, systems or modules may comprise and/or interact with computer readable media storing data according to various data structures.

With reference ID(i) (i=1, 2, . . . ) it is identified a generic unmanned autonomous vehicle, such as a flying drone.

According to an embodiment of the present invention, the unmanned autonomous vehicle ID(i) is configured to move in an automatic way by means of an automatic drive system 105 which is remote with respect to the unmanned autonomous vehicle ID(i) itself. According to an embodiment of the present invention, the automatic drive system 105 is configured to interact with the unmanned autonomous vehicle ID(i) by exchanging commands, messages and data.

According to an embodiment of the present invention, the automatic drive system 105 is configured to send control commands CC(i) to the unmanned autonomous vehicle ID(i) to drive the movement of the unmanned autonomous vehicle ID(i). Non-limiting examples of control commands CC(i) may include commands for setting the speed, the course and the height of the unmanned autonomous vehicle ID(i).

According to an embodiment of the present invention, the unmanned autonomous vehicle ID(i) is configured to send vehicle status data VS(i) to the automatic drive system 105 indicative of the status of the unmanned autonomous vehicle ID(i). Non-limiting examples of vehicle status data VD(i) may include data about battery life, data about actual geographical position, data about actual height, data about actual speed, data indicative of specific fault occurrences.

According to an embodiment of the present invention, the automatic drive system 105 comprises one or more processing (e.g., server) units 108 (only one depicted in figure) each one executing one or more corresponding software and/or firmware applications 110 (only one depicted in figure). According to an embodiment of the present invention, the one or more processing units 108 are coupled to a communication network 112, such as the internet, in such a way to allow the automatic drive system 105 to exchange data with other entities coupled to the communication network 112. For example, the applications 110 may be part of a cloud computing system.

According to an embodiment of the present invention, the automatic drive system 105 and the unmanned autonomous vehicle ID(i) are configured to exchange commands, messages and data through a communication link comprising a first communication link, globally identified in FIG. 1 as CH1, between the unmanned autonomous vehicle ID(i) and the communication network 112. For example, according to an embodiment of the present invention, the automatic drive system 105 is configured to send control commands CC(i) to the unmanned autonomous vehicle ID(i) and to receive vehicle status data VS(i) from the unmanned autonomous vehicle ID(i) exploiting the first communication link CH1.

According to an embodiment of the present invention, the first communication link CH1 is a wireless communication link, such as for example a cellular communication link established through a mobile communication network (e.g., a 3G, 4G or 5G mobile communication network not illustrated in figure) or a Wi-Fi communication link.

According to an embodiment of the present invention, a user can interact with the unmanned autonomous vehicle ID(i) using a user equipment UE, such as a smartphone, a tablet, a personal computer, adapted to communicate and interact with the automatic drive system 105 through a communication link, identified as "user communication link" UCH, between the communication network 112 and the user equipment UE. The user communication link UCH can be a wired or wireless communication link, including for example a cellular communication link, a Wi-Fi communication link, a fiber communication link, an xDSL communication link.

According to an embodiment of the present invention, one or more unmanned autonomous vehicle flight terminator units T(j) (j=1, 2, . . . ) (hereinafter, simply referred to as "terminator units") are provided, configured to interface with the unmanned autonomous vehicle ID(i) and the automatic drive system 105 without involving the first communication link CH1.

According to an embodiment of the present invention, the terminator units T(j) are hardware units located across a geographic area over which or near which the unmanned autonomous vehicles ID(i) fly.

According to an embodiment of the present invention, the terminator units T(j) are configured to forward to an unmanned autonomous vehicle ID(i) a flight termination command FTC(ID(i)) triggering a flight termination procedure for the unmanned autonomous vehicle ID(i) without having to involve the first communication link CH1. In this way, a flight termination procedure can be triggered so as to guarantee a safe flight termination of an unmanned autonomous vehicle ID(i) even in a condition in which the first communication link CH1 between the unmanned autonomous vehicle ID(i) and the communication network 112 is malfunctioning or not operative. For this purpose, according to an embodiment of the present invention, the terminator units T(j) are configured to interact with the unmanned autonomous vehicle ID(i) and with the automatic drive system 105 by exchanging commands, messages and data through communication links different from the first communication link CH1. In other words, the terminator units T(j) provide an alternative communication link that can be expediently exploited for triggering a flight termination procedure instead of the first communication link CH1.

Moreover, according to an embodiment of the present invention, the terminator units T(j) are also configured to allow unmanned autonomous vehicles ID(i) to communicate with the automatic drive system 105 of the unmanned autonomous vehicles ID(i), without having to involve the first communication link CH1. In this way, the automatic drive system 105—and possibly a user of a user equipment UE interfaced with the automatic drive system 105—may still assess the state (e.g., the position) of an unmanned autonomous vehicles ID(i) and accordingly be aware of possible critical conditions requiring the triggering of a flight termination procedure for the unmanned autonomous vehicles ID(i) when the first communication link CH1 between the unmanned autonomous vehicle ID(i) and the automatic drive system 105 is malfunctioning or not operative. For this purpose, according to an embodiment of the present invention, the terminator units T(j) are configured to interact with the unmanned autonomous vehicles ID(i) and with the automatic drive system 105 by exchanging messages and data through other communication links different from the first communication link CH1. In other words, the terminator units T(j) provide a communication link, alternative to the first communication link CH1, that can be expediently exploited for gathering data from unmanned autonomous vehicles ID(i) useful for assessing the necessity of triggering a flight termination procedure.

According to an embodiment of the present invention, the terminator units T(j) are configured to exchange data with the automatic drive system 105 through a second communication link CH2—between the terminator units T(j) and the communication network 112—different from the first communication link CH1. For example, the second communication link CH2 may be a wireless communication link, such as a Wi-Fi communication link (e.g., exploiting a dedicated frequency), or a wired communication link, such as a fiber communication link or an xDSL communication link.

According to an embodiment of the present invention, the terminator units T(j) are configured to exchange commands, messages and data with the unmanned autonomous vehicle ID(i) through a third communication link CH3—between the terminator units T(j) and the unmanned autonomous vehicle ID(i)—different from the first communication link CH1. According to an embodiment of the present invention, the third communication link CH3 is a wireless communication link, such as for example a Wi-Fi communication link exploiting a dedicated frequency, e.g., a not licensed frequency like a frequency belonging to the Industrial, Scientific and Medical (ISM) band, or other kinds of wireless communication links using frequencies, technologies and/or parameters different from the ones of the first communication link CH1.

FIG. 1 illustrates in terms of very generic functional blocks details of a possible implementation of a terminator unit T(j) according to an embodiment of the present invention. According to an embodiment of the present invention, the terminator unit T(j) comprises a transmitting and receiving module 140 configured to allow exchange of data, messages and/or commands with the automatic drive system 105 (through the second communication link CH2) and with the unmanned autonomous vehicles ID(i) (through the third communication link CH3).

According to an embodiment of the present invention, in order to reduce power consumption (particularly relevant in case the terminator unit is battery-powered) the transmitting and receiving module 140 may be advantageously configured to selectively enable-disable the communication with the unmanned autonomous vehicles ID(i) through the third communication link CH3. For example, according to an embodiment of the present invention, the terminator unit T(j) may be configured to operate in a "reduced power mode", in which the transmitting and receiving module 140 is enabled to communicate only with the communication network 112 (through the second communication link CH2), and not with the unmanned autonomous vehicles ID(i), and may be configured to switch to an "active power mode", in which the transmitting and receiving module 140 is also enabled to communicate with the unmanned autonomous vehicles ID(i) (through the third communication link CH3).

According to an embodiment of the present invention, the terminator unit T(j) comprises a processing module 150 configured to interact with the automatic drive system 105 (e.g., with the application 110 executed by the processing unit 108 of the automatic drive system 105) and carry out process operations for allowing the triggering of the flight termination procedure, managing associations between the terminator unit T(j) and unmanned autonomous vehicles ID(i), and forwarding data about the status of unmanned autonomous vehicles ID(i) to the automatic drive system 105, as will be described in detail in the following of the description. According to an embodiment of the present invention, the terminator unit T(j) further comprises a storage module 160 configured to store data, e.g., in the form of one or more tables, identifying associations between the terminator unit T(j) and unmanned autonomous vehicles ID(i), as will be described in details in the following of the description.

Figure 2:
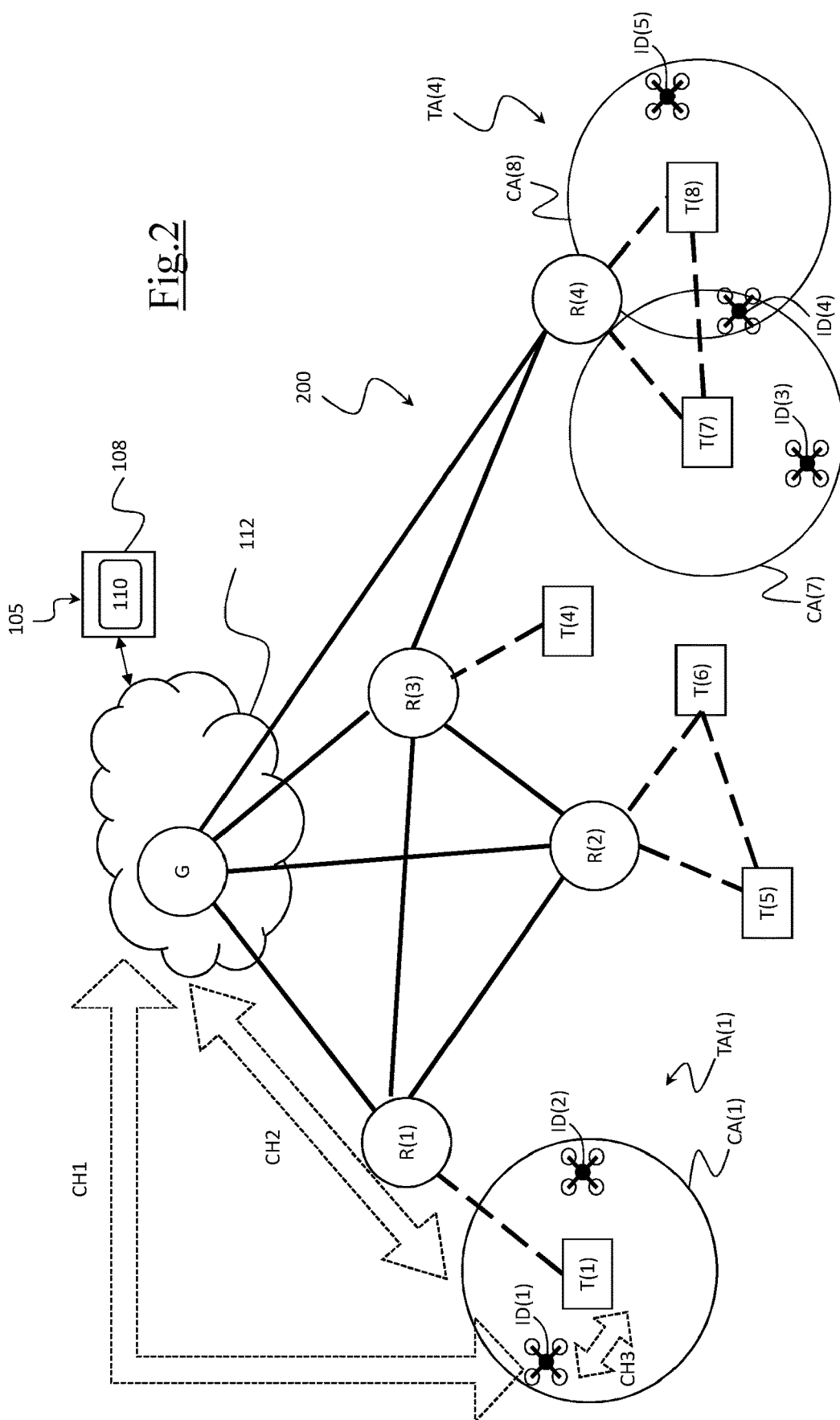
FIG. 2 illustrates a terminator network according to an embodiment of the present invention.

With reference to FIG. 2, according to an embodiment of the invention, the terminator units T(j) are arranged across a geographic area and are interconnected in a terminator network 200 implementing (at least a portion of) the second communication link CH2 (see FIG. 1) through which terminator units T(j) and the automatic drive system 105 can communicate for exchanging data, messages and commands.

Moreover, according to an embodiment of the present invention, each terminator unit T(j) is configured to set-up a corresponding (wireless) third communication link CH3 (see FIG. 1) with unmanned autonomous vehicles ID(i) located in a corresponding coverage area, or coverage volume, CA(j) in the geographic space around the terminator unit T(j). In the following, the term coverage area will be used to indicate the volume of space reachable by a terminator unit T(j) through the third communication link CH3, but also to indicate the area projected on the ground by such reachable volume of space. As will be described in detail in the following of the present invention, an unmanned autonomous vehicle ID(i) which is located inside the coverage area CA(j) of a terminator unit T(j) can be associated to the terminator unit T(j) itself in order to allow the terminator unit T(j) and the associated unmanned autonomous vehicle ID(i) to exchange data, messages and commands through the third communication link CH3. The extension (e.g., radius) of the coverage area CA(j) of a terminator unit T(j) depends on the transmitting and receiving module 140 of the terminator unit T(j). In any case, the coverage area CA(j) is included in the radio coverage of the transmitting and receiving module 140 of the terminator unit T(j).

According to an embodiment of the present invention, the terminator network 200 comprises one or more gateway modules G (only one illustrated in the figures), for example included in the communication network 112, coupled to the automatic drive system 105 and carrying out the function of main interface through which data, messages and commands are routed between the terminator units T(j) and the automatic drive system 105 along the second communication link CH2.

According to an embodiment of the present invention, the terminator network 200 further comprises one or more router modules R(k) (k=1, 2, . . . ) connected between the gateway modules G and the terminator units T(j) and configured to:

keep track of associations between unmanned autonomous vehicles ID(i) and terminator units T(j), established by the terminator units T(j) themselves based on the actual location of the unmanned autonomous vehicles ID(i) with respect to the coverage areas CA(j) of the terminator units T(j);

route data, messages and commands sent by the gateway modules G to the terminator units T(j) and by the terminator units T(j) to the gateway modules G by implementing (at least a portion of) the second communication link CH2.

According to an embodiment of the present invention, the generic terminator unit T(j) in the terminator network 200 is configured to:

exchange messages and commands between unmanned autonomous vehicles ID(i) that are inside its corresponding coverage area CA(j) through the third communication link CH3, such as for example flight termination commands FTC(ID(i)) for triggering the flight termination of selected associated unmanned autonomous vehicles ID(i) that are inside its corresponding coverage area CA(j);

managing associations between the terminator unit T(j) and unmanned autonomous vehicles ID(i) that are inside its corresponding coverage area CA(j);

generate terminator status data indicative of the status of the terminator unit T(j), for example in terms of identification of the unmanned autonomous vehicles ID(i) actually associated to the terminator unit T(j), geographical position of the terminator unit T(j), extension (e.g., radius) of its coverage area CA(j), battery level of the terminator unit T(j) (if the terminator unit is battery-powered).

Different network topologies can be used for connecting the router modules R(k) to the gateway modules G and for connecting the terminator units T(j) to the router modules R(k), such as for example mesh, bus or star topologies, or a combination thereof. For example, according to a preferred embodiment of the present invention, the chosen network topology may be such as to guarantee a sufficient router scalability and at the same time a terminator unit power consumption efficiency.

The area obtained by the union of the coverage areas CA(j) of the terminator units T(j) associated to a same router module R(k) is herein identified as termination area TA(k).

In the example illustrated in FIG. 2, the termination area TA(1) corresponding to the router module R(1) coincides with the coverage area CA(1), since the terminator unit T(1) is the only terminator unit T(j) associated to the router module R(1), while the termination area TA(4) corresponding to the router module R(4) corresponds to the union of the coverage area CA(7) with the coverage area CA(8), since the terminator units T(7) and T(8) are associated to the router module R(4).

In the example illustrated in FIG. 2:

the unmanned autonomous vehicles ID(1) and ID(2) are in the coverage area CA(1) of the terminator unit T(1) and in the termination area TA(1) of the router module R(1);

the unmanned autonomous vehicle ID(3) is in the coverage area CA(7) of the terminator unit T(7) and in the termination area TA(4) of the router module R(4);

the unmanned autonomous vehicle ID(5) is in the coverage area CA(8) of the terminator unit T(8) and in the termination area TA(4) of the router module R(4);

the unmanned autonomous vehicle ID(4) is both in the coverage area CA(7) of the terminator unit T(7) and in the coverage area CA(8) of the terminator unit T(8), and is in the termination area TA(4) of the router module R(4);

As will be described in greater detail in the following of the present description, in the abovementioned example:

the router module R(1) will associate the unmanned autonomous vehicles ID(1) and ID(2) to the terminator unit T(1);

the router module R(4) will associate the unmanned autonomous vehicle ID(3) to the terminator unit T(7);

the router module R(4) will associate the unmanned autonomous vehicle ID(5) to the terminator unit T(8);

the router module R(4) will associate the unmanned autonomous vehicle ID(4) to both the terminator units T(7) and T(8).

In synthesis, according to an embodiment of the present invention, the terminator network 200 comprising the terminator units T(i) and the router modules R(k) advantageously implements:

a second communication link CH2 between the terminator units T(j) and the communication network 112—and therefore the automatic drive system 105—through the gateway modules G and the router modules R(k), and a third communication link CH3 between the terminator units T(j) and the unmanned autonomous vehicles ID(i) through the radio link enabled within the coverage areas CA(j).

As will be described in the following, the terminator network 200 according to embodiments of the present invention implements a communication channel that can be exploited in both directions, such as for example from the automatic drive system 105 to the unmanned autonomous vehicles ID(i) (e.g., for forwarding flight termination commands FTC(ID(i))), and from the unmanned autonomous vehicles ID(i) to router modules R(k) (e.g., for updating information regarding associations among unmanned autonomous vehicles ID(i) and terminator units T(j)).

Hereinbelow, a more detailed description of main functions of the terminator network 200 according to embodiments of the present invention will be provided. As already mentioned above, functions of the terminator network 200 according to embodiments of the present invention comprise:

managing associations between unmanned autonomous vehicles ID(i) and terminator units T(j) based on the position of the unmanned autonomous vehicles ID(i) with respect to the coverage areas CA(j) of the terminator units T(j), and allowing the flight termination of selected unmanned autonomous vehicle ID(i) associated to the terminator units T(j) by forwarding flight termination commands FTC(ID(i)) to the selected associated unmanned autonomous vehicle ID(i) without having to use the first communication link CH1.

According to a first embodiment of the present invention (herein referred to as "External Association Procedure"), the association between unmanned autonomous vehicle ID(i) and terminator units T(j) is carried out by exploiting the first communication link CH1.

According to a second embodiment of the present invention (herein referred to as "Internal Association Procedure"), the association between unmanned autonomous vehicle ID(i) and terminator units T(j) is instead carried out without exploiting the first communication link CH1, and therefore it can be carried out also when the first communication link CH1 is malfunctioning or not operative.

According to an embodiment of the present invention, both the External Association Procedure and the Internal Association Procedure provide for managing associations between unmanned autonomous vehicles ID(i) and terminator units T(j) using so-called "terminator tables" TT(j) and "router tables" RT(k).

According to an embodiment of the present invention, each terminator unit T(j) is configured to store, for example in its storage module 160 (see FIG. 1), a corresponding terminator table TT(j) listing the unmanned autonomous vehicles ID(i) actually associated to the terminator unit T(j). The unmanned autonomous vehicles ID(i) listed in a terminator table TT(j) corresponding to a terminator unit T(j) are assessed to be located within the coverage area CA(j) of the terminator unit T(j).

By making reference to the exemplary case illustrated in FIG. 2, in which the unmanned autonomous vehicles ID(1) and ID(2) are associated to the terminator unit T(1) because they are within the coverage area CA(1), the unmanned autonomous vehicle ID(3) is associated to the terminator unit T(7) because it is within the coverage area CA(7), the unmanned autonomous vehicle ID(5) is associated to the terminator unit T(8) because it is within the coverage area CA(8), and the unmanned autonomous vehicle ID(4) is associated to both the terminator units T(7) and T(8) because it is within the coverage area CA(7) and at the same time within the coverage area CA(8), an example of the terminator tables TT(1), TT(7), TT(8) according to an embodiment of the present invention is reported hereinbelow:

| TT(1) |
|---|
| ID(1) |
| ID(2) |

| TT(7) |
|---|
| ID(3) |
| ID(4) |

| TT(8) |
|---|
| ID(4) |
| ID(5) | wherein ID(i) is an identifier of the unmanned autonomous vehicle ID(i).

According to an embodiment of the present invention, each router module R(k) is configured to store, for example in a storage module at the router module R(k) itself, a corresponding router table RT(k) listing for each one of the terminator units T(j) associated to the router module R(k), the unmanned autonomous vehicles ID(i) actually associated to the terminator units T(j). The unmanned autonomous vehicles ID(i) listed in a router table RT(k) corresponding to a router unit R(k) are assessed to be located within the termination area TA(k) of the router unit R(k).

By making again reference to the exemplary case illustrated in FIG. 2, an example of the router tables RT(1), RT(4) according to an embodiment of the present invention is reported hereinbelow:

| RT(1) | |
|---|---|
| T(1) | ID(1) |
| T(1) | ID(2) |

| RT(4) | |
|---|---|
| T(7) | ID(3) |
| T(7) | ID(4) |
| T(8) | ID(4) |
| T(8) | ID(5) | wherein T(j) is an identifier of the terminator unit T(j) associated to the router unit R(k) corresponding to the router table RT(k).

External Association Procedure

Figure 3:
FIG. 3 illustrates an external association procedure according to an embodiment of the present invention.

By making reference to FIG. 3, according to an embodiment of the present invention, the external association procedure is carried out by exploiting a traffic management application 305 executed by one or more processing units 310 coupled to the communication network 112, such as an Unmanned Traffic Management (UTM) application. The external association procedure provides that the traffic management application 305 exchanges data with the unmanned autonomous vehicle ID(i) through a communication link comprising the first communication link CH1 between the unmanned autonomous vehicle ID(i) and the communication network 112.

According to an embodiment of the present invention, the generic unmanned autonomous vehicle ID(i) periodically informs the traffic management application 305 about its state during its travel, by sending its vehicle status data VS(i) (including its identifier ID(i) together with data about actual geographical position, and for example one or more of data about battery life, data about actual height, data about actual speed and flight direction, data indicative of specific fault occurrences) to the traffic management application 305 exploiting the first communication link CH1. By making reference to the unmanned autonomous vehicle ID(1), this operation is identified in FIG. 3 with reference I(1).

According to an embodiment of the present invention, upon reception of the vehicle status data VS(i), the traffic management application 305 notifies a gateway module G of the terminator network 200 of the state of the unmanned autonomous vehicle ID(i), by forwarding the received vehicle status data VS(i) to the gateway module G through the communication network 112. By making reference to the unmanned autonomous vehicle ID(1), this operation is identified in FIG. 3 with reference I(2).

According to an embodiment of the present invention, upon reception of the vehicle status data VS(i), the gateway module G selects the router module(s) R(k) of the terminator network 200 whose corresponding terminator area(s) TA(k) comprise(s) the actual geographical position of the unmanned autonomous vehicle ID(i) (obtained from the vehicle status data VS(i)). By making reference to the unmanned autonomous vehicle ID(1), which is included in the termination area TA(1) of the router module R(1), this operation is identified in FIG. 3 with reference I(3).

According to an embodiment of the present invention, upon reception of the vehicle status data VS(i), the selected router module R(k) selects the terminator units T(j) associated thereto whose coverage areas CA(j) comprise the actual geographical position of the unmanned autonomous vehicle ID(i) and, unless the unmanned autonomous vehicle ID(i) was already recorded by the selected router module R(k) as being associated to the selected terminator units T(j), sends a switch-on message SWON(ID(i)) to the selected terminator units T(j). By making reference to the unmanned autonomous vehicle ID(1), which is included in the coverage area CA(1) of the terminator unit T(1), this operation is identified in FIG. 3 with reference I(4).

It is pointed out that the operations I(3) and I(4) relate to exchanges of messages carried out on the second communication link CH2.

According to an embodiment of the present invention, upon reception of the switch-on message SWON(ID(i)), the selected terminator units T(j) switch to the active power mode (if they were in the reduced power mode) to enable communication with the unmanned autonomous vehicles on the third communication link CH3, and send (broadcast) an interrogation message IDOT(ID(i)) comprising as a parameter the identifier ID(i) of the unmanned autonomous vehicle ID(i) (obtained through the received vehicle status data VS(i)) in the corresponding coverage areas CA(j) exploiting the third communication link CH3. By making reference to the unmanned autonomous vehicle ID(1) and the terminator unit T(1), this operation is identified in FIG. 3 with reference I(5).

According to an embodiment of the present invention, upon reception of the interrogation message IDOT(ID(i)) from one or more of the selected terminator units T(j), the unmanned autonomous vehicle ID(i) identified by the same identifier ID(i) included in the interrogation message IDOT(ID(i)) answers by sending to the latter acknowledge message(s) ACK(ID(i)) including its identifier ID(i) exploiting the third communication link CH3. By making reference to the unmanned autonomous vehicle ID(1) and the terminator unit T(1), this operation is identified in FIG. 3 with reference I(6).

According to an embodiment of the present invention, upon reception of the acknowledge message ACK(ID(i)) from an unmanned autonomous vehicle ID(i), the autonomous vehicle ID(i) is associated to the terminator unit T(j) having sent the interrogation message IDOT(ID(i)), by having the terminator unit T(j) insert the identifier ID(i) in its terminator table TT(j), and send an update message UP(ID(i), T(j), ADD) to the router module R(k) the terminator T(j) is associated to in order to update the corresponding router table RT(k) with the newly associated autonomous vehicle ID(i). By making reference to the unmanned autonomous vehicle ID(1), the terminator unit T(1), and the router module R(k), this operation is identified in FIG. 3 with reference I(7).

According to an embodiment of the present invention, once an unmanned autonomous vehicle ID(i) has been associated to a terminator unit T(j), and therefore its identifier ID(i) has been inserted in the corresponding terminator table TT(j) and router table RT(k), the exchange of messages IDOT(ID(i)) and ACK(ID(i)) between the terminator unit T(j) and unmanned autonomous vehicle ID(i) is periodically repeated. As long as the terminator unit T(j) receives from the unmanned autonomous vehicle ID(i) acknowledge messages ACK(ID(i)) in response to its interrogation message IDOT(ID(i)), the association between the unmanned autonomous vehicle ID(i) and the terminator unit T(j) maintained, and no new update message UP(ID(i), T(j), ADD) needs to be sent to the router module R(k) the terminator T(j) was associated to.

According to an embodiment of the present invention, if no acknowledge message ACK(ID(i)) is received from a terminator unit T(j) in response to an interrogation message IDOT(ID(i)) after a predefined period (time out period TO) is expired, the terminator unit T(j) assesses that the unmanned autonomous vehicle ID(i) identified by the identifier ID(i) included in the interrogation message IDOT(ID(i)) is no more located within the coverage area CA(j) of the terminator unit T(j). In this situation, the unmanned autonomous vehicle ID(i) is disassociated from the terminator unit T(j) by having the terminator unit T(j) remove the identifier ID(i) corresponding to the unmanned autonomous vehicle ID(i) from its terminator table TT(j), and send a new update message UP(ID(i), T(j), REMOVE) to the router module R(k) the terminator unit T(j) is associated to in order to accordingly update the corresponding router table RT(k) (i.e., for removing the identifier ID(i) therefrom). By making reference to the unmanned autonomous vehicle ID(1), the terminator unit T(1), and the router module R(k), this operation is identified in FIG. 3 with reference I(8).

According to an embodiment of the present invention, when two or more unmanned autonomous vehicles ID(i) are associated to a same terminator unit T(j), the terminator unit T(j) is configured to send a plurality of interrogation messages IDOT(ID(i)), each one comprising as a parameter the identifier ID(i) of one of the unmanned autonomous vehicles ID(i) associated to the terminator unit T(j).

According to an embodiment of the present invention, when the a terminator unit T(j) does not have any unmanned autonomous vehicle ID(i) associated thereto (i.e., once its terminator table TT(j) becomes empty), the terminator unit T(j) can be advantageously switched to the reduced power mode (i.e., disabling the communication through the third communication link CH3), reducing the whole power consumption of the system (particularly useful in case of battery operated terminator units T(j)).

It is pointed out that in the external association procedure described above, before new unmanned autonomous vehicles ID(i) are associated to one or more terminator units T(j), the identification and localization of such autonomous vehicles ID(i) is carried out by means of the vehicle status data VS(i) collected by the traffic management application 305—involving thus the first communication link CH1. Once an unmanned autonomous vehicle ID(i) is associated to one or more terminator units T(j), and as long as the exchange of messages IDOT(ID(i)) and ACK(ID(i)) between the terminator unit(s) T(j) and unmanned autonomous vehicle ID(i) is repeated, the communication between the associated unmanned autonomous vehicle ID(i) and the terminator units T(j) is carried out without requiring the vehicle status data VS(i), and therefore without exploiting the first communication link CH1 (the identifier ID(i) of the unmanned autonomous vehicle ID(i) being stored in the terminator table TT(j) and in the router table RT(k)).

Figure 4:
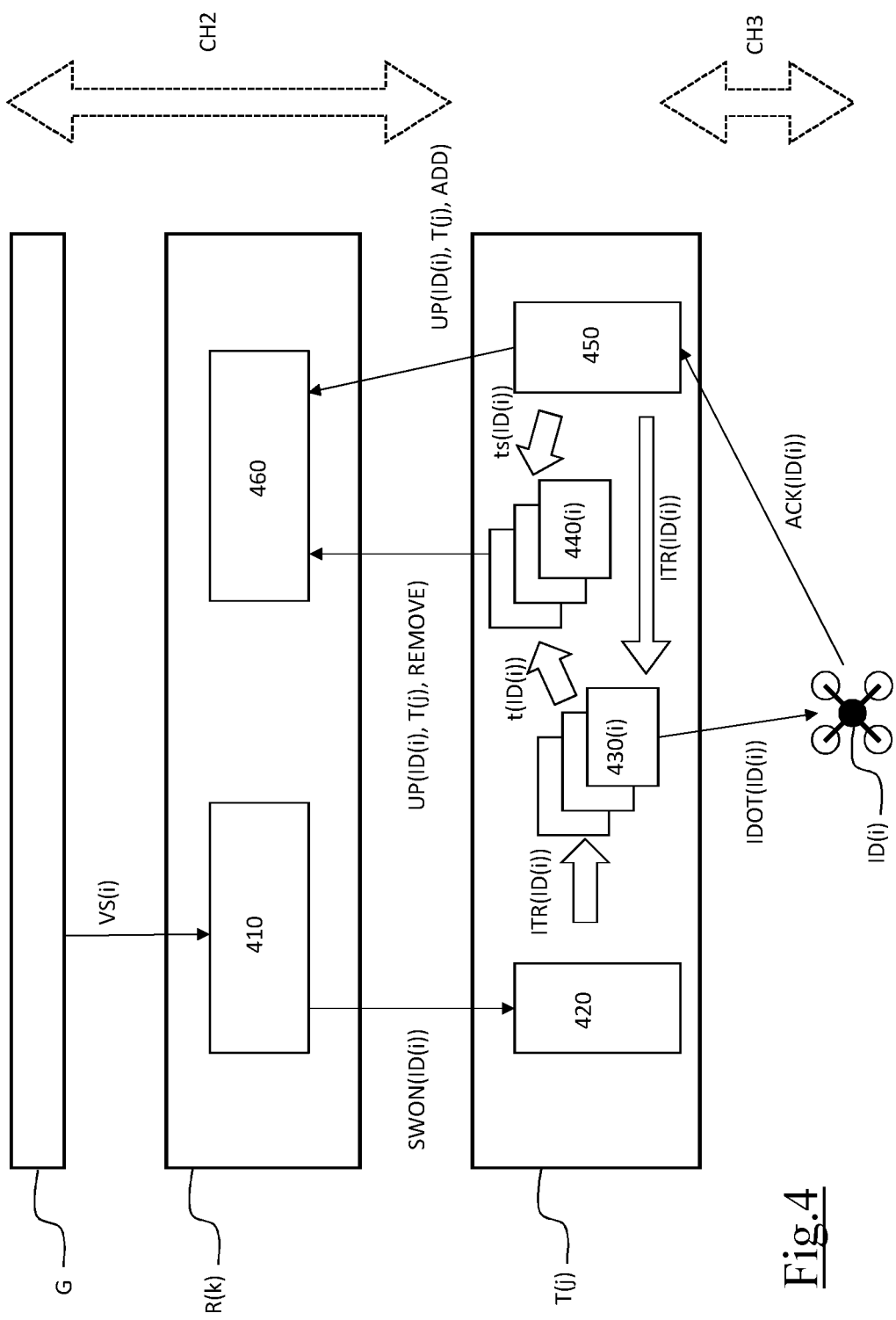
FIG. 4 illustrates in terms of logic modules procedures carried out during an external association procedure according to an embodiment of the present invention.

In order to describe in greater detail the operations I(3)-I(8) of the external association procedure according to an embodiment of the present invention, reference will be now made to FIG. 4, which shows in terms of logic modules the procedures carried out by the gateway module G, a router module R(k), a terminator unit T(j) and an unmanned autonomous vehicle ID(i) according to an embodiment of the present invention.

Figure 5A:
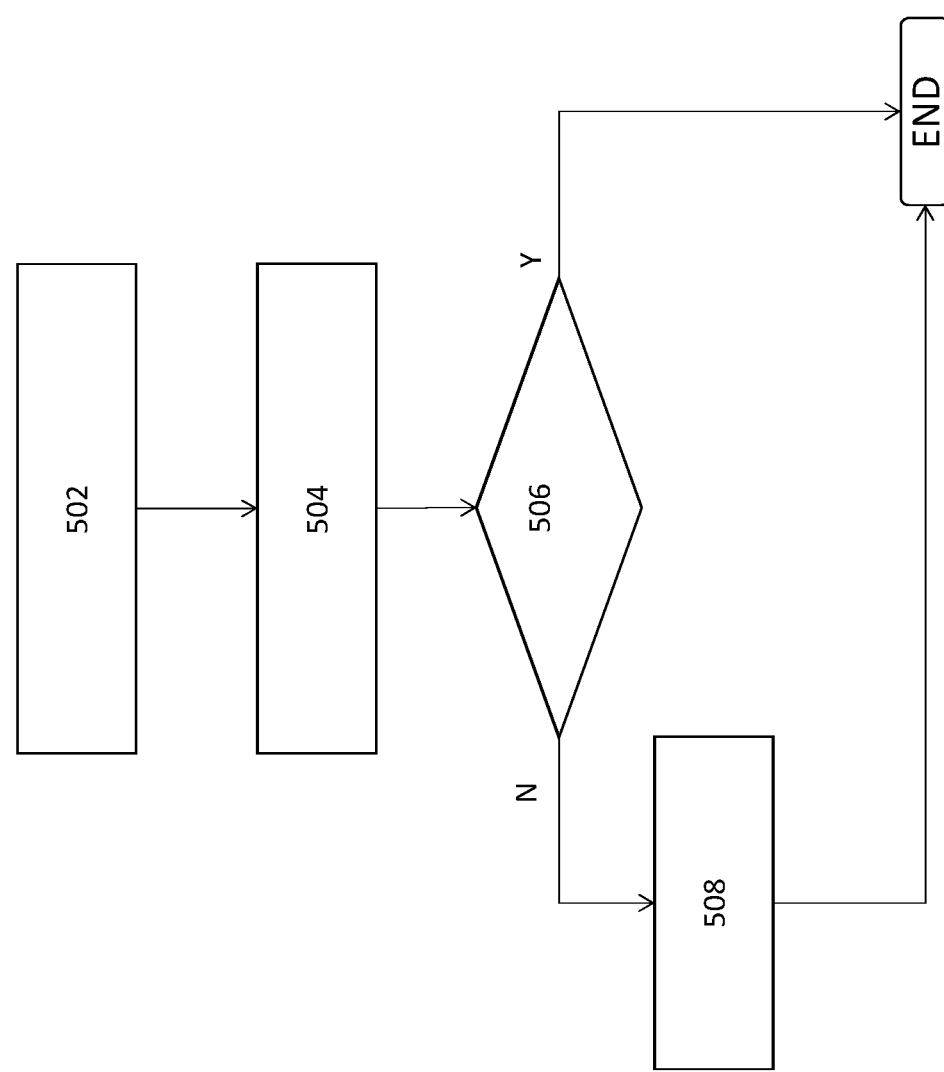
FIGS. 5A-5F are flow charts of operations carried out by the procedures illustrated in FIG. 4.

According to an embodiment of the present invention, the router module R(k) is configured to execute a vehicle status receiving procedure 410 providing for the following operations (illustrated in the flow chart of FIG. 5A and identified with references 502-508).

According to an embodiment of the present invention, the vehicle status receiving procedure 410 provides for receiving from the gateway module G through the second communication channel CH2 the vehicle status data VS(i) of unmanned autonomous vehicles ID(i) whose actual position (obtained from the vehicle status data VS(i) gathered through the traffic management application 305) is located in the terminator area TA(k) corresponding to the router module R(k) (block 502).

According to an embodiment of the present invention, the vehicle status receiving procedure 410 selects one or more terminator units T(j) (among the terminator units T(j) associated to the router module R(k)) based on the received vehicle status data VS(i) (block 504). According to an embodiment of the present invention, this operation is carried out by extracting from the vehicle status data VS(i) the geographical position of the unmanned autonomous vehicle ID(i) and selecting the terminator unit(s) T(j) whose coverage area(s) CA(j) comprise the position.

According to an embodiment of the present invention, the vehicle status receiving procedure 410 further provides for checking whether the unmanned autonomous vehicle ID(i) identified by the received vehicle status data VS(i) is already associated to the selected terminator unit(s) T(j) or not (block 506). According to an embodiment of the present invention, this operation is carried out by checking whether the identifier ID(i) of the unmanned autonomous vehicle ID(i) is already listed in the router table RT(k) of the router module R(k) or not.

According to an embodiment of the present invention, if the unmanned autonomous vehicle ID(i) was not already associated to the selected terminator unit(s) T(j) (exit branch N of block 506), a switch-on message SWON(ID(i)) is sent to the selected terminator unit(s) T(j) through the second communication link CH2 (block 508), otherwise, if the unmanned autonomous vehicle ID(i) was already associated to the selected terminator unit(s) T(j) (exit branch Y of block 506), no switch-on message SWON(ID(i)) is sent. According to an embodiment of the present invention, the switch-on message SWON(ID(i)) comprises as a parameter the identifier ID(i) of the unmanned autonomous vehicle ID(i) corresponding to the received vehicle status data VS(i).

It is pointed out that the operation carried out at block 502 corresponds to the previously described operation I(3), while the operations carried out at blocks 504-508 correspond to the previously described operation I(4) (see FIG. 3).

Figure 5B:

Returning back to FIG. 4, according to an embodiment of the present invention, the terminator unit T(j) is configured to execute a switch-on receiving procedure 420 providing for the following operations (illustrated in the flow chart of FIG. 5B and identified with references 509-512).

According to an embodiment of the present invention, the switch-on receiving procedure 420 provides for receiving the switch-on message SWON(ID(i)) from the router module R(k) (block 509). Then, if the terminator unit T(j) is in the reduced power mode (exit branch N of block 510) the switch-on receiving procedure 420 provides for switching the terminator unit T(j) in the active power mode (block 511), to enable communication between the terminator unit T(j) and the unmanned autonomous vehicle ID(i) through the third communication link CH3.

According to an embodiment of the invention, after the terminator unit T(j) is switched to the active power mode, or in case the terminator unit T(j) was already in the active power mode (exit branch Y of block 510), the switch-on receiving procedure 420 provides for generating an interrogation triggering command ITR(ID(i)), comprising as a parameter the same identifier ID(i) included as a parameter in the received switch-on message SWON(ID(i)) (block 512).

Figure 5C:
Figure 5C:
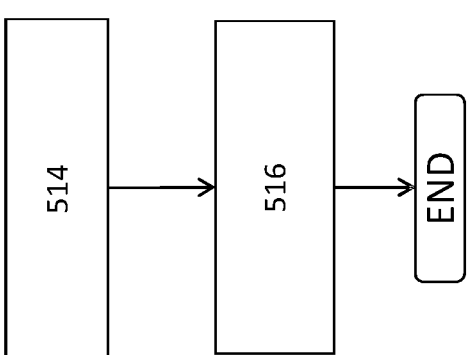

Returning back to FIG. 4, according to an embodiment of the present invention, the terminator unit T(j) is configured to execute, in response to an interrogation triggering command ITR(ID(i)), an interrogation message procedure 430(i) for broadcasting in its coverage area CA(j) an interrogation message IDOT(ID(i)), comprising as a parameter the same identifier ID(i) included in the received interrogation triggering command ITR(ID(i)), directed to the unmanned autonomous vehicle ID(i) corresponding to the identifier ID(i). According to an embodiment of the present invention, the interrogation message procedure 430(i) provides for the following operations (illustrated in the flow chart of FIG. 5C and identified with references 514-516).

According to an embodiment of the present invention, upon the generation of the interrogation triggering command ITR(ID(i)), the interrogation message procedure 430(i) provides for controlling the transmitting and receiving module 140 of the terminator unit T(j) in such a way as to broadcast, exploiting the third communication link CH3, an interrogation message IDOT(ID(i)), comprising as a parameter the same identifier ID(i) included in the received interrogation triggering command ITR(ID(i)) (block 514). The interrogation message IDOT(ID(i)) will be received by all the unmanned autonomous vehicles ID(i) actually located within the coverage area CA(j) of the terminator unit T(j). If the unmanned autonomous vehicle ID(i) corresponding to the identifier ID(i) included in the interrogation message IDOT(ID(i)) receives the interrogation message IDOT(ID(i)), it will respond by sending back to the terminator unit T(j) a corresponding acknowledge message ACK(ID(i)) comprising the same identifier ID(i).

It is pointed out that the operation carried out at block 514 corresponds to the previously described operations I(5) and I(6) (see FIG. 3).

According to an embodiment of the present invention, after the interrogation message IDOT(ID(i)) is sent, the interrogation message procedure 430(i) provides for generating a timer triggering command t (ID(i)) (block 516) for causing the execution by the terminator unit T(j) of a corresponding timer procedure 440(i) corresponding to the identifier ID(i) (see FIG. 4).

Figure 5D:
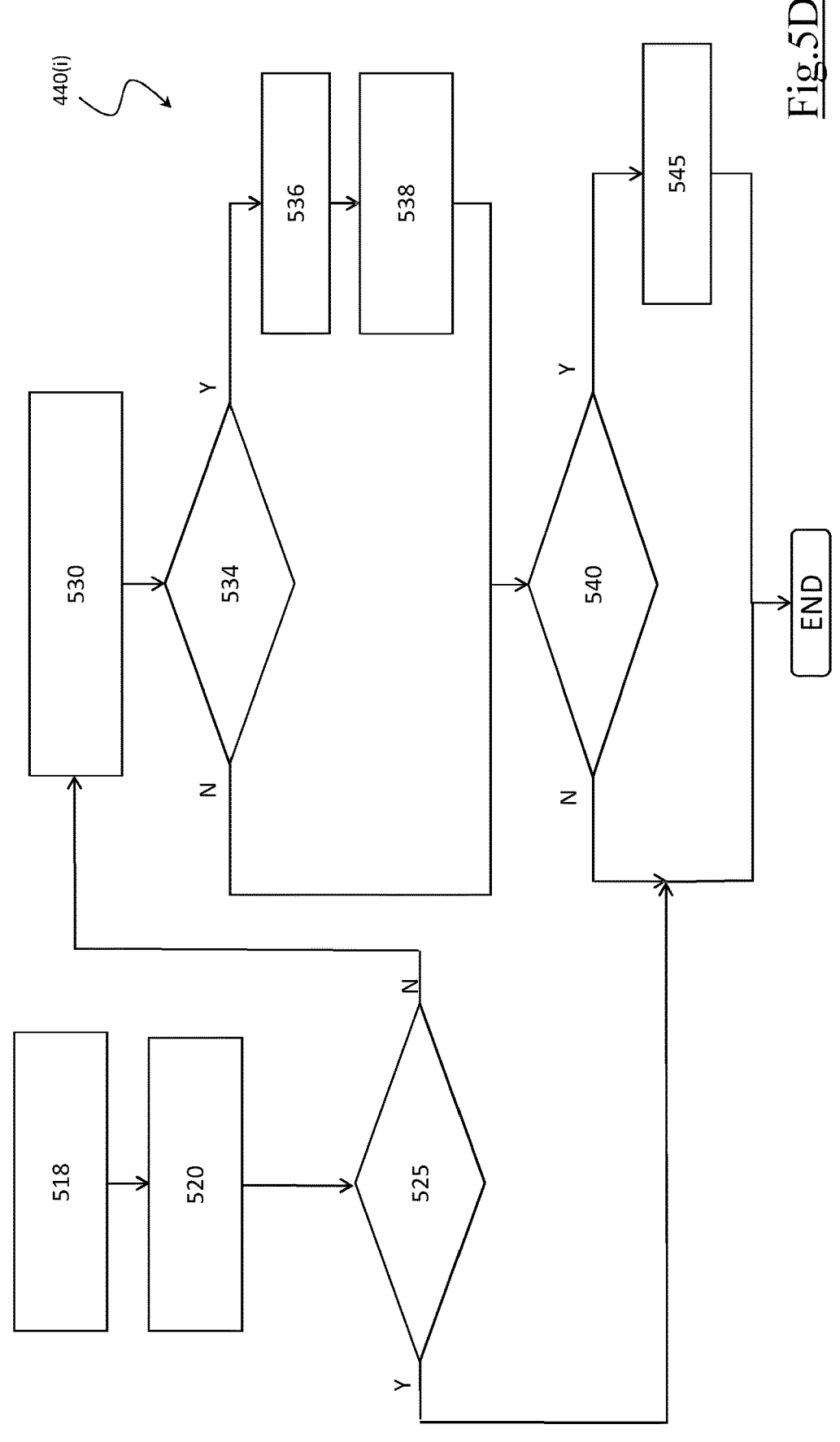

According to an embodiment of the present invention, the timer procedure 440(i) provides for the following operations (illustrated in the flow chart of FIG. 5D and identified with references 518-545).

According to an embodiment of the present invention, the timer procedure 440(i) provides for initializing (block 518) a time counter TC(i) to a predefined starting value (time out period TO). A countdown is then started, with the time counter TC(i) that is progressively decremented (block 520).

As will be described in detail in the following, during the time out period TO after the countdown is started, according to an embodiment of the present invention the (e.g., countdown of the) time counter TC(i) is stopped when the terminator unit T(j) receives an acknowledge message ACK (ID(i)) comprising the identifier ID(i). In this way, the zeroing of the time counter TC(i) may be prevented before the time out period TO is expired.

According to an embodiment of the present invention, when the time counter TC(i) reaches zero (block 530), meaning that no acknowledge message ACK(ID(i)) comprising the identifier ID(i) has been received during the time out period TO, the terminator unit T(j) assesses that the unmanned autonomous vehicle ID(i) corresponding to the identifier ID(i) included in the interrogation message IDOT (ID(i)) is no more located inside its coverage area CA(j).

Naturally, similar considerations apply if the time out period TO is counted in a different way, such as for example with a time counter TC(i) initialized to zero, and progressively incremented until reaching the value TO.

According to an embodiment of the present invention, upon the expiration of the time out period TO, the timer procedure 440(*i*) provides for checking if the unmanned autonomous vehicle ID(i) identified by the identifier ID(i) is listed in the terminator table TT(j) of the terminator unit T(j) (block 534).

According to an embodiment of the present invention, if the unmanned autonomous vehicle ID(i) identified by the identifier ID(i) is listed in the terminator table TT(j) (exit branch Y of block 534), meaning that the unmanned autonomous vehicle ID(i) was already associated to the terminator unit T(j), the timer procedure 440(*i*) provides for disassociating the unmanned autonomous vehicle ID(i) from the terminator unit T(j) by removing it from the terminator table TT(j) (block 536), and by sending through the second communication link CH2 a corresponding update message UP(ID(i), T(j), REMOVE) to the router module R(k), comprising the identifier ID(i) of the unmanned autonomous vehicle ID(i), an identifier T(j) of the terminator unit T(j) and a "REMOVE" parameter (block 538).

It is pointed out that the operation carried out at block 538 corresponds to the previously described operation I(8) (see FIG. 3).

According to an embodiment of the present invention, after the sending of the update message UP(ID(i), T(j), REMOVE), or in case the unmanned autonomous vehicle ID(i) identified by the identifier ID(i) was not listed in the terminator table TT(j) (exit branch N of block 534), the timer procedure 440(*i*) provides for checking whether the terminator table TT(j) of the terminator unit T(j) is empty or not (block 540).

According to an embodiment of the present invention, if the terminator table TT(j) is empty (exit branch Y of block 540), meaning that no unmanned autonomous vehicles ID(i) are associated to the terminator unit T(j), the timer procedure 440(*i*) may provide for switching the terminator unit in the reduced power mode (block 545), disabling thus communication between the terminator unit T(j) and the unmanned communication modules ID(i) through the third communication link CH3.

Otherwise, the terminator unit T(j) is kept in the active power module (exit branch N of block 540).

Returning back to FIG. 4, according to an embodiment of the present invention, the terminator unit T(j) is configured to execute an acknowledge message receiving procedure 450 upon the reception of an acknowledge message ACK (ID(i)) from the unmanned autonomous vehicle ID(i) through the third communication link CH3. As already mentioned above, the acknowledge message ACK(ID(i)) includes as a parameter the identifier ID(i) of the unmanned autonomous vehicle ID(i) having generated the acknowledge message ACK(ID(i)).

Figure 5E:
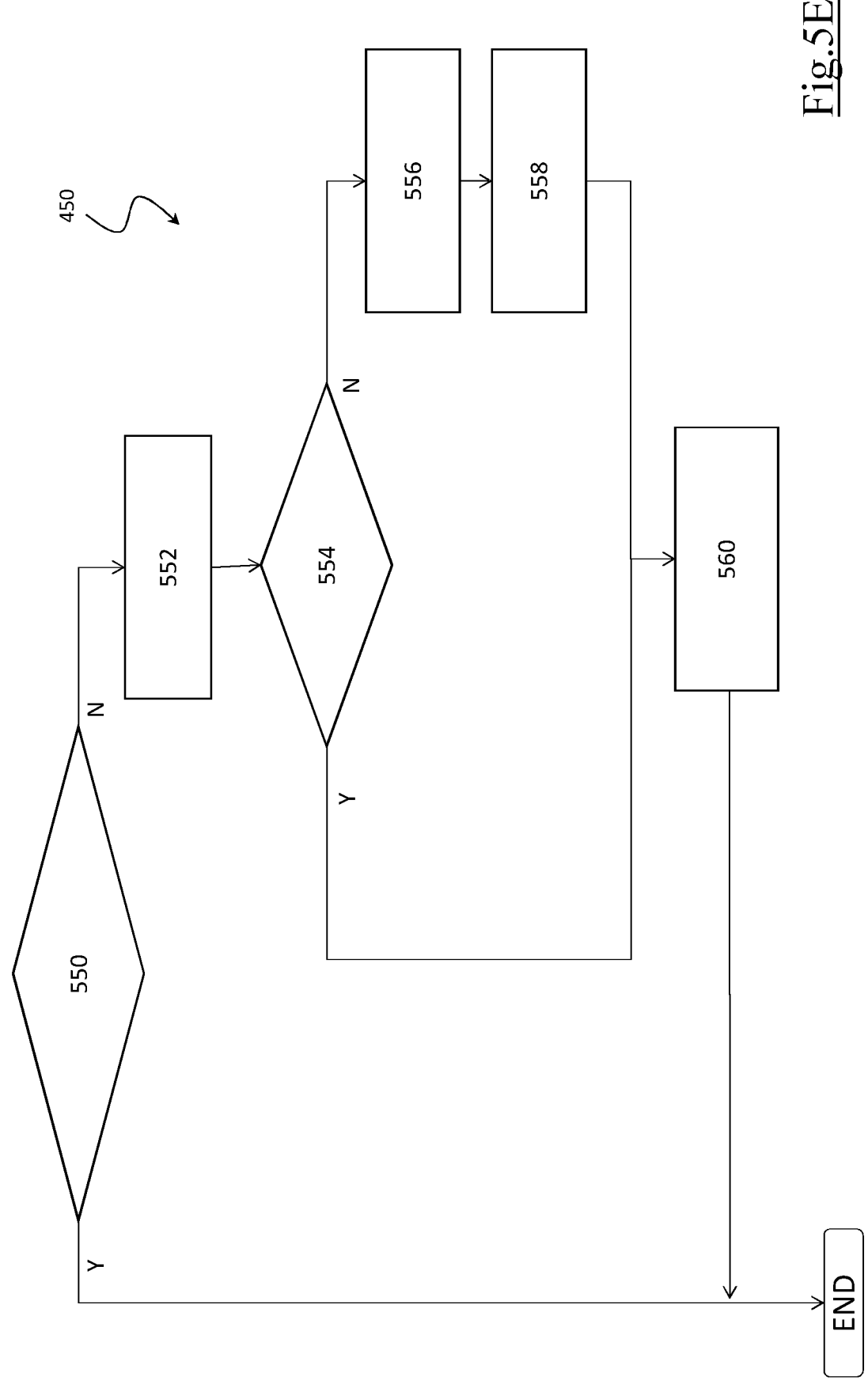

According to an embodiment of the present invention, the acknowledge message receiving procedure 450 provides for the following operations illustrated in the flow chart of FIG. 5E and identified with references 550-560.

According to an embodiment of the present invention, the acknowledge message receiving procedure 450 provides for checking whether the time counter TC(i) in the timer procedure 440(*i*) corresponding to the same identifier ID(i) has been stopped or not (block 550).

According to an embodiment of the present invention, if the countdown (or count up) of the time counter TC(i) in the timer procedure 440(*i*) corresponding to the identifier ID(i) has been already stopped (exit branch Y of block 550), the acknowledge message receiving procedure 450 is terminated.

According to an embodiment of the present invention, if the countdown (or count up) of the time counter TC(i) in the timer procedure 440(*i*) corresponding to the identifier ID(i) is still being carried out (and the time out period TO is not yet expired) (exit branch N of block 550), the acknowledge message receiving procedure 450 provides for generating a timer stop command ts(ID(i)) directed to stop the countdown (or count up) of the time counter TC(i) in the timer procedure 440(*i*), so as to prevent the expiration of the time out period TO (block 552).

At this point, according to an embodiment of the present invention, the acknowledge message receiving procedure 450 provides for checking if the unmanned autonomous vehicle ID(i) identified by the identifier ID(i) was already listed in the terminator table TT(j) of the terminator unit T(j) (block 554).

According to an embodiment of the present invention, if the unmanned autonomous vehicle ID(i) identified by the identifier ID(i) was not already listed in the terminator table TT(j) (exit branch N of block 554), meaning that the unmanned autonomous vehicle ID(i) was not yet associated to the terminator unit T(j), the acknowledge message receiving procedure 450 provides for associating the unmanned autonomous vehicle ID(i) to the terminator unit T(j) by adding it to the terminator table TT(j) (block 556), and by sending through the second communication link CH2 a corresponding update message UP(ID(i), T(j), ADD) to the router module R(k), comprising the identifier ID(i) of the unmanned autonomous vehicle ID(i), an identifier of the terminator unit T(j) and an "ADD" parameter (block 558).

It is pointed out that the operation carried out at block 558 corresponds to the previously described operation I(7) (see FIG. 3).

According to an embodiment of the present invention, after the sending of the update message UP(ID(i), T(j), ADD), or in case the unmanned autonomous vehicle ID(i) identified by the identifier ID(i) was already listed in the terminator table TT(j) (exit branch Y of block 554), the acknowledge message receiving procedure 450 provides for generating a further interrogation triggering command ITR (ID(i)), comprising as a parameter the same identifier ID(i), (block 560) to trigger the execution of a new interrogation message procedure 430(*i*) and a corresponding new timer procedure 440(*i*).

Figure 5F:
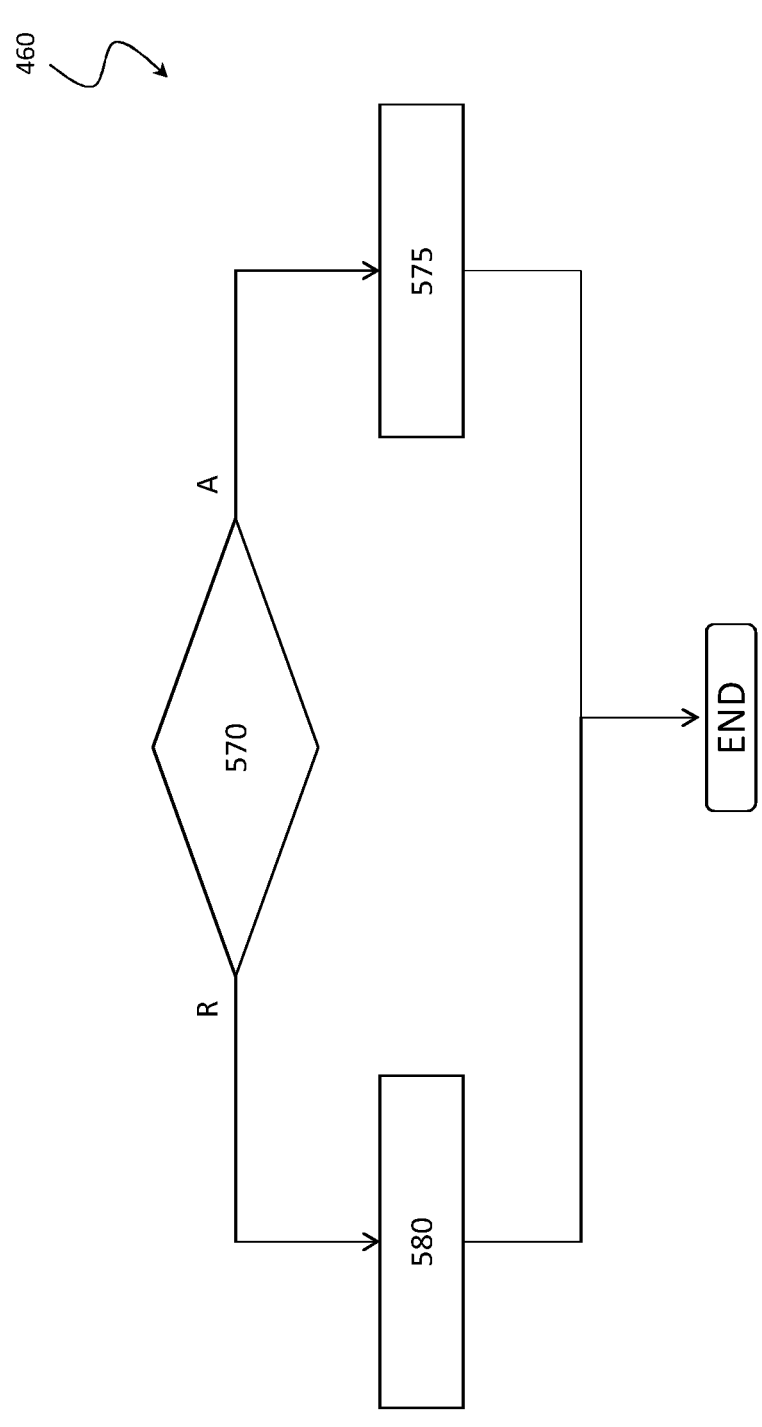

Returning back to FIG. 4, according to an embodiment of the present invention, the router module R(k) is configured to execute, in response to the reception from the terminator unit T(j) of an update message UP(ID(i), T(j), ADD) or of an update message UP(ID(i), T(j), REMOVE), an update procedure 460 providing for the following operations (illustrated in the flow chart of FIG. 5F and identified with references 570-580).

According to an embodiment of the present invention, the update procedure 460 provides for checking if the received update message contains the "ADD" parameter or the "REMOVE" parameter (block 570). If the received update message comprise the "ADD" parameter (i.e., the update message is UP(ID(i), T(j), ADD)), the update procedure 460 provides for adding the unmanned autonomous vehicle ID(i) corresponding to the identifier ID(i) included in the received update message to its router table RT(k) (exit branch A of block 570, then, block 575). As already mentioned above, according to an embodiment of the present invention, this is done by inserting in the router table RT(k) the identifier ID(i) of the unmanned autonomous vehicle ID(i) paired with the identifier T(j) of the terminator unit T(j) the unmanned autonomous vehicle ID(i) has been associated to. If the received update message comprise the "REMOVE" parameter (i.e., the update message is UP(ID(i), T(j), REMOVE)), the update procedure 460 provides for removing the unmanned autonomous vehicle ID(i) corresponding to the identifier ID(i) included in the received update message from its router table RT(k) (exit branch R of block 570, then, block 580).

Figure 6:
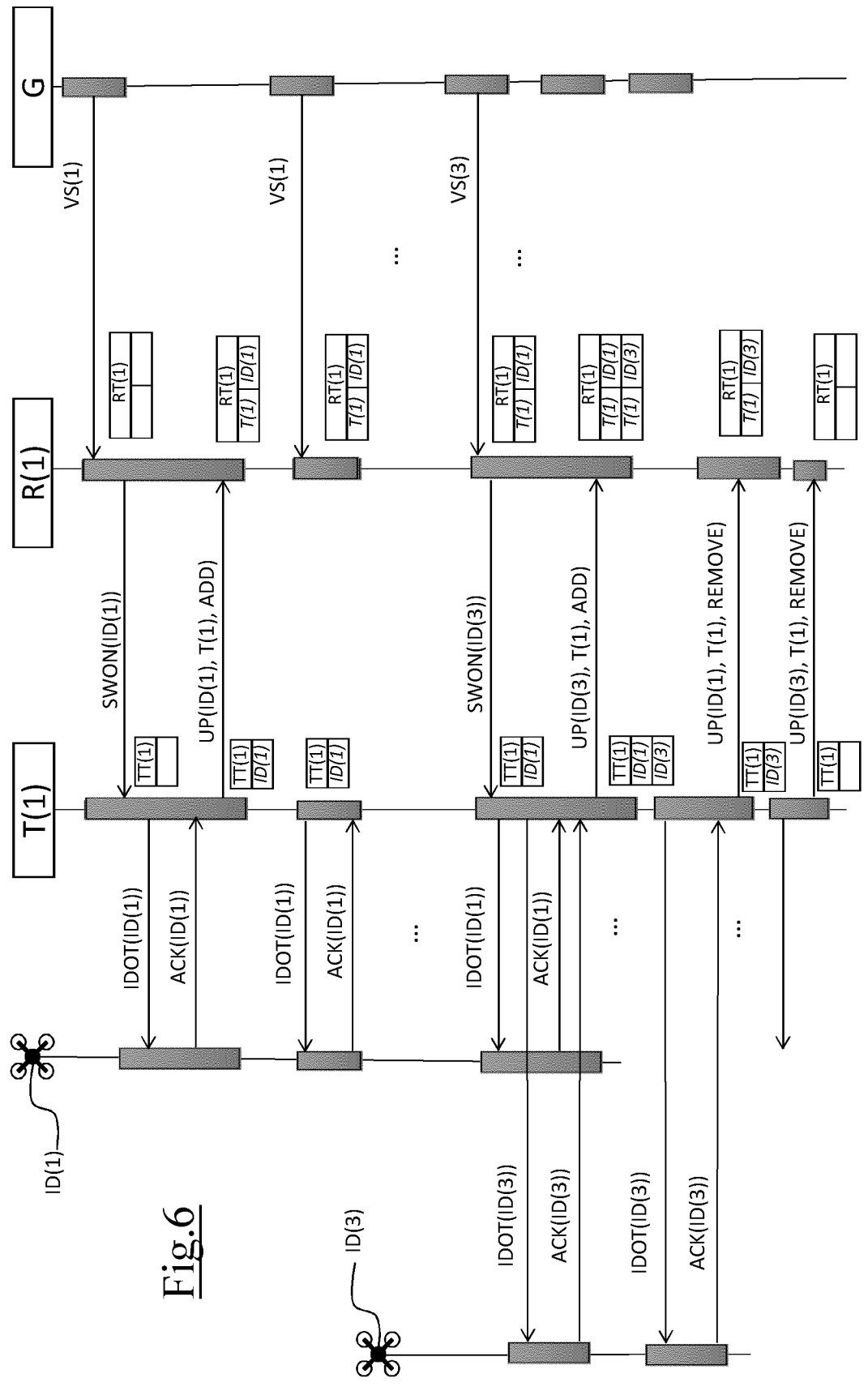
FIG. 6 shows exchange of messages carried out during an exemplary external association procedure according to an embodiment of the present invention

FIG. 6 shows the exchange of messages between the gateway module G, the router module R(1), the terminator unit T(1) and the unmanned autonomous vehicles ID(1) and ID(3) of FIG. 3 during an exemplary external association procedure which provides for a starting condition in which the terminator unit T(1) is not associated with any unmanned autonomous vehicle ID(i), followed by the following sequence of events:

the unmanned autonomous vehicle ID(1) enters in the coverage area CA(1) of the terminator unit T(1);

the unmanned autonomous vehicle ID(3) enters in the coverage area CA(1) of the terminator unit T(1);

the unmanned autonomous vehicle ID(1) leaves the coverage area CA(1) of the terminator unit T(1);

the unmanned autonomous vehicle ID(3) leaves the coverage area CA(1) of the terminator unit T(1).

It is pointed out that in the external association procedure according to the embodiments of the invention described above, the router modules R(k) and the terminator units T(j), in addition to routing the switch-on messages SWON(ID(i)), allow to decouple the reception frequency of the vehicle status data VS(i) by the router modules R(k) from the exchange of interrogation messages IDOT(ID(i)) and acknowledge messages ACK(ID(i)) between terminator units T(j) and unmanned autonomous vehicles ID(i).

Moreover, it is pointed out the external association procedure according to the embodiments of the invention described above directly applies also in the case in which an unmanned autonomous vehicle ID(i) enters in the intersection of two different coverage areas CA(j) of two different terminator units T(j) associated to the same router module R(k) (i.e., corresponding to a same termination area TA(k)). In this case, the following operations are carried out:

based on the received vehicle status data VS(i), the router module R(k) sends a switch-on message SWON(ID(i)) corresponding to the unmanned autonomous vehicle ID(i) to a first terminator unit T(j) of the two;

the first terminator unit T(j) will start an exchange of messages IDOT(ID(i)) and ACK(ID(i)) with the unmanned autonomous vehicle ID(i);

the first terminator unit T(j) will associate the unmanned autonomous vehicle ID(i) and send in turn an update message UP(ID(i), T(j), ADD) to the router module R(k);

a further switch-on message SWON(ID(i)) corresponding to the same unmanned autonomous vehicle ID(i) is sent to the second terminator unit T(j) of the two;

the second terminator unit T(j) will start an exchange of messages IDOT(ID(i)) and ACK(ID(i)) with the unmanned autonomous vehicle ID(i);

the second terminator unit T(j) will associate the unmanned autonomous vehicle ID(i) and send in turn an update message UP(ID(i), T(j), ADD) to the router module R(k).

Furthermore, similar considerations apply also in case an unmanned autonomous vehicle ID(i) enters in the intersection of two different termination areas TA(k) of two different router modules R(k). In this case, the vehicle status data VS(i) corresponding to the unmanned autonomous vehicle ID(i) is provided by the gateway module G to the two different router modules R(k) at the same time. Then, each router module R(k) performs the operations described above. It is pointed out that in this particular case the unmanned autonomous vehicle ID(i) should be capable of answering with an acknowledge message ACK(ID(i)) to more than one terminator unit T(j) at the same time. For this reason, according to an embodiment of the present invention, an unmanned autonomous vehicle ID(i) might be capable of tuning to different channels, e.g., to different frequency carriers.

Internal Association Procedure

Figure 7:
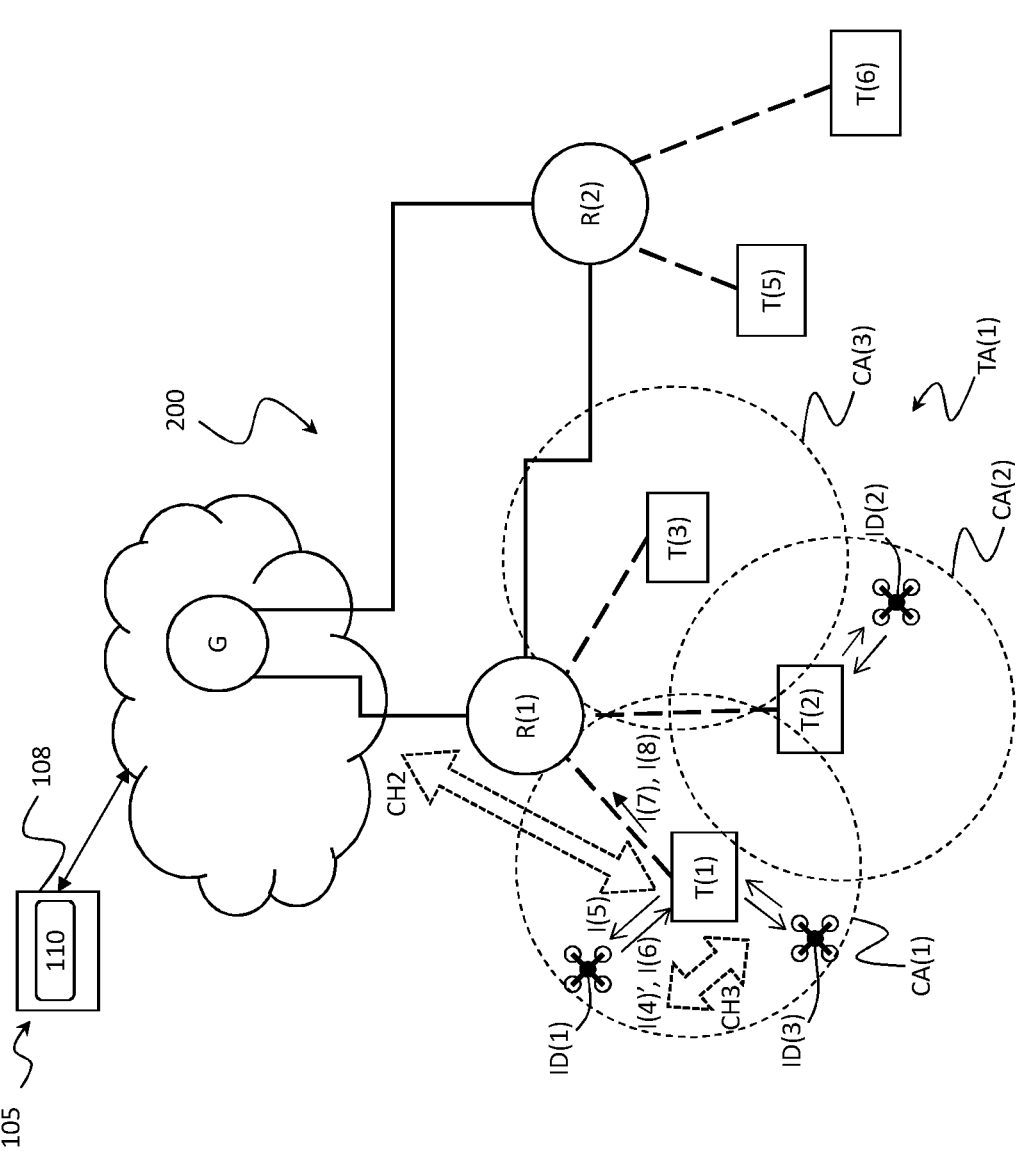
FIG. 7 shows an external association procedure according to an embodiment of the present invention.

By making reference to FIG. 7, according to an embodiment of the present invention, the internal association procedure is managed internally by the terminator network 200, without involving external entities coupled to the terminator network 200 through the communication network 112, and therefore without involving the first communication link CH1.

According to an embodiment of the present invention, the internal association procedure is directly initiated by the unmanned autonomous vehicles ID(i) themselves, which directly broadcast a switch-on message SWON(ID(i)) including their identifier ID(i) as a parameter.

In other words, the operations I(1), I(2) and I(3) of the external association procedure (see FIG. 3) are not carried out, and the first operation of the internal association procedure according to an embodiment of the present invention provides for having the unmanned autonomous vehicle ID(i) broadcast a switch-on message SWON(ID(i)) exploiting the third communication link CH3. By making reference to the unmanned autonomous vehicle ID(1), this operation is identified in FIG. 7 with reference I(4)'.

Then, according to an embodiment of the present invention, the internal association procedure provides for carrying out the operations I(5)-I(8) already described with reference to the external association procedure.

Figure 8:
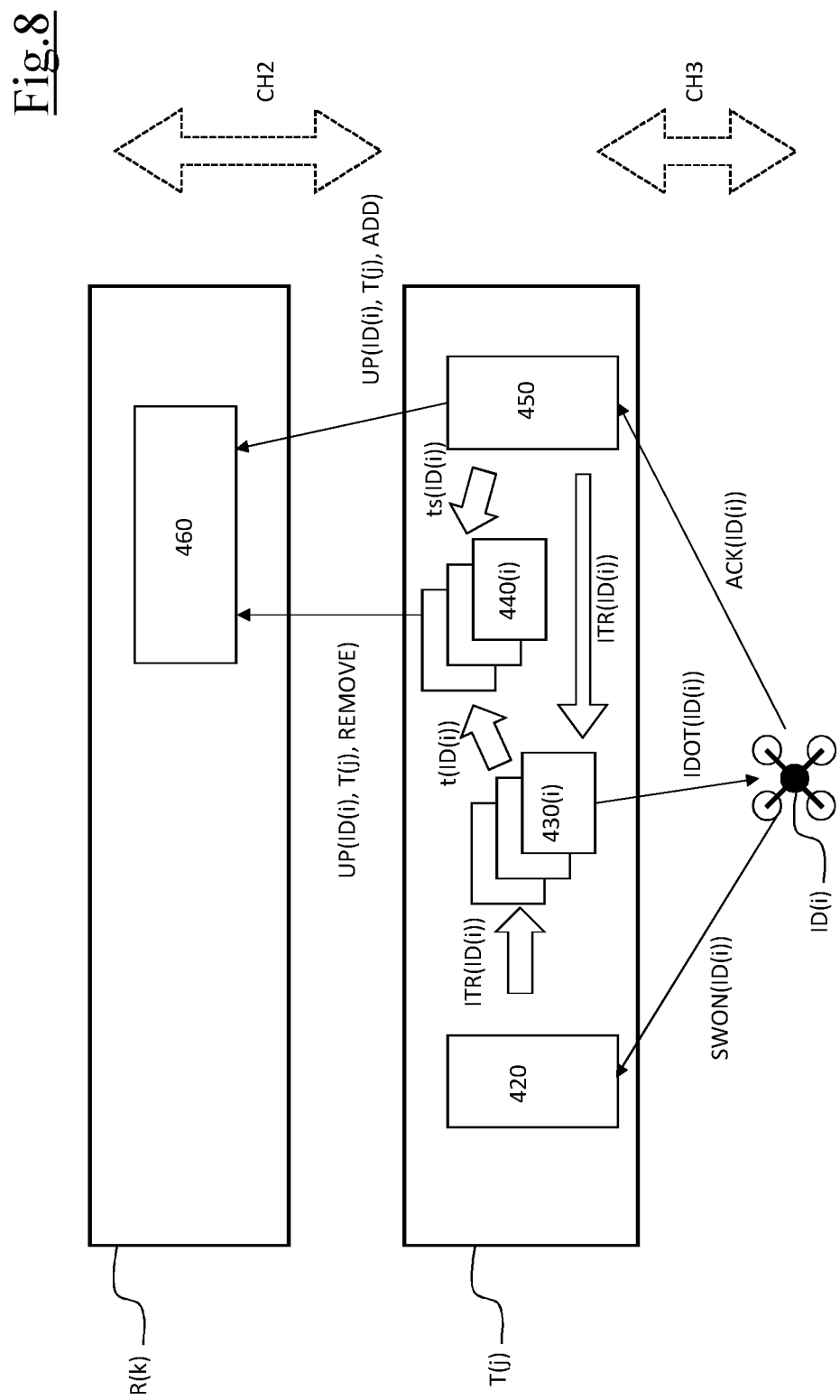
FIG. 8 illustrates in terms of logic modules procedures carried out during an internal association procedure according to an embodiment of the present invention.

FIG. 8 shows in terms of logic modules the procedures carried out by a router module R(k), a terminator unit T(j) and an unmanned autonomous vehicle ID(i) during an internal association procedure according to an embodiment of the present invention. Compared to the case of the external association procedure, the router module R(k) does not have to execute a vehicle status receiving procedure (identified with reference 410 in FIG. 4) because according to the internal association procedure, the switch-on message SWON(ID(i)) is provided to the terminator unit T(j) directly by the unmanned autonomous vehicle ID(i).

The internal association procedure according to an embodiment of the present invention provides for having the terminator unit T(j) carry out a switch-on receiving procedure equal to the already described switch-on receiving procedure 420 of the external association procedure, with the only difference that the switch-on message SWON(ID (i)) is provided by the unmanned autonomous vehicle ID(i) and not from the router module R(k).

The other procedures already described with reference to the external association procedure, including the interrogation message procedures 430(i), the timer procedures 440(i), the acknowledge message receiving procedure 450, and the update procedure 460 are instead carried out in the same way.

Flight Termination Triggering Procedure

Figure 9:
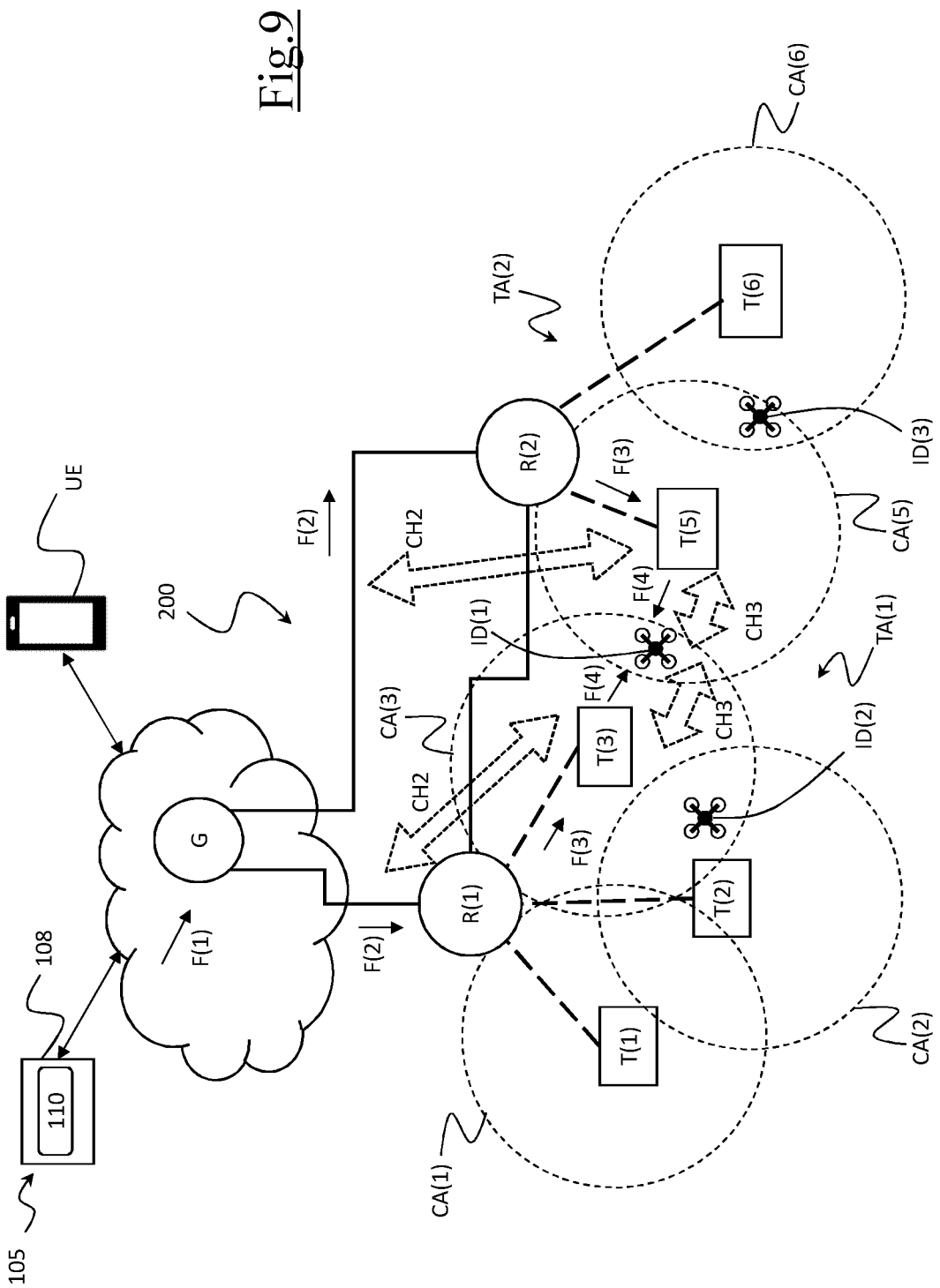
FIG. 9 shows flight termination triggering procedure according to an embodiment of the present invention.

By making reference to FIG. 9, it will be now described in greater detail a procedure for triggering a flight termination ("flight termination triggering procedure") of an unmanned autonomous vehicle ID(i) (in the illustrated example, the unmanned autonomous vehicle ID(1)) exploiting the terminator network 200 according to an embodiment of the present invention.

According to an embodiment of the present invention, the first operation of the flight termination triggering procedure (identified in FIG. 9 with reference F(1)) provides that an entity external to the terminator network 220, for example connected to the communication network 112 forwards a flight termination command FTC(ID(i))—comprising as a parameter the identifier ID(i) of an unmanned autonomous vehicle ID(i) the flight of which has to be terminated—to the gateway module G. For example, the entity forwarding the flight termination command FTC(ID(i)) may be the automatic drive system 105 (e.g., in case of an automatic flight termination procedure) and/or a user equipment UE (e.g., in case of a manual flight termination procedure).

According to an embodiment of the present invention, the flight termination command FTC(ID(i)) is then forwarded by the gateway module G to the router modules R(k) connected to the gateway module G. This operation is identified in FIG. 9 with reference F(2).

According to an embodiment of the present invention, upon reception of the flight termination command FTC(ID (i)), each router module R(k) whose corresponding router table RT(k) comprises the identifier ID(i) included in the flight termination command FTC(ID(i)) (i.e., each router model R(k) having a corresponding termination area TA(k) containing the actual position of the unmanned autonomous vehicle ID(i) whose flight is to be terminated) forwards the received flight termination command FTC(ID(i)) to the terminator units T(j) associated to the router module R(k) that are actually associated to the unmanned autonomous vehicle ID(i) corresponding to the identifier ID(i) (i.e., to the terminator units T(j) having a corresponding coverage area CA(j) containing the actual position of the unmanned autonomous vehicle ID(i) whose flight is to be terminated). This operation is identified in FIG. 9 with reference F(3). In the example illustrated in FIG. 9, the unmanned autonomous vehicle ID(1) whose flight has to be terminated is located at the intersection of the termination areas TA(1) and TA(2), and therefore, both the router module R(1) and the router module R(2) forward the flight termination command FTC (ID(i)) to its terminator units T(j) associated to the autonomous vehicle ID(1) (in the illustrated example, the terminator unit T(3) associated to the router module R(1) and the terminator unit T(5) associated to the router module R(2)).

According to an embodiment of the present invention, the terminator units T(j) having received the flight termination command FTC(ID(i)) broadcast the flight termination command FTC(ID(i)) in their respective coverage areas CA(j), so that the unmanned autonomous vehicle ID(i) identified by the identifier ID(i) included in the flight termination command FTC(ID(i)) starts a flight termination procedure to terminate its flight in a safe and controlled way. This operation is identified in FIG. 9 with reference F(4).

It is pointed out that both the operations F(2) and F(3) described above provide to forward the flight termination command FTC(ID(i)) through the second communication link CH2, while the operation F(4) described above provides to forward the flight termination command FTC(ID(i)) through the third communication link CH3. In other words, according to the embodiment of the invention herein described, the triggering of a flight termination procedure is carried out without involving the first communication link CH1, and therefore it can guarantee a safe flight termination of an unmanned autonomous vehicle ID(i) even in a condition in which the first communication link CH1 between the unmanned autonomous vehicle ID(i) and the communication network 112 is malfunctioning or not operative.

Figure 10:
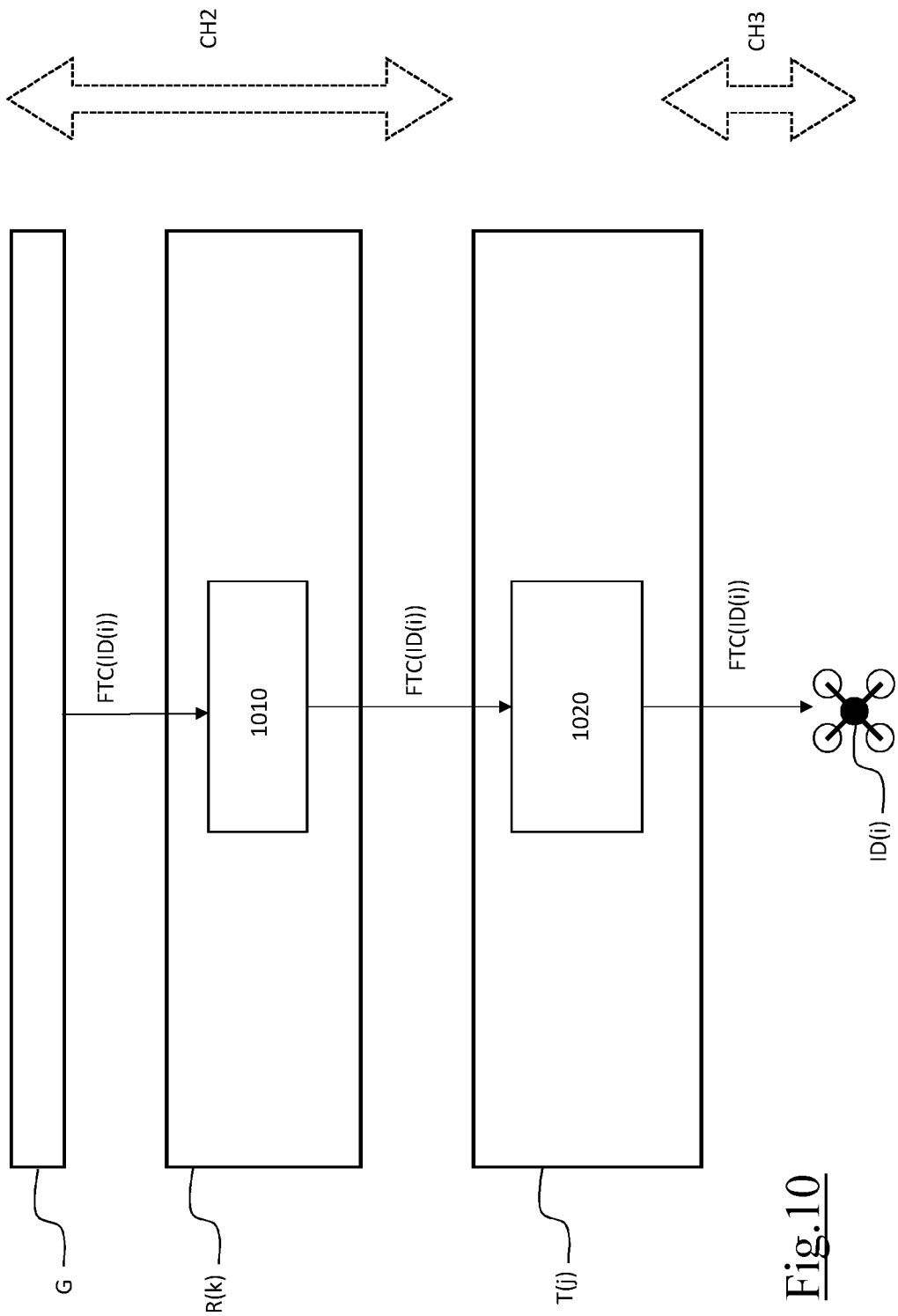
FIG. 10 illustrates in terms of logic modules procedures carried out during a flight termination triggering procedure according to an embodiment of the present invention.

FIG. 10 shows in terms of logic modules the procedures carried out by the gateway module G, a router module R(k), a terminator unit T(j) and an unmanned autonomous vehicle ID(i) for executing the operations F(2)-F(3)-F(4) of the flight termination triggering procedure according to an embodiment of the present invention.

According to an embodiment of the present invention, after the operation F(2), carried out as described above, the operation F(3) provides for having the router module R(k) execute a router flight termination procedure 1010 upon the reception of a flight termination command FTC(ID(i)) comprising as a parameter an identifier ID(i) of an unmanned autonomous vehicle ID(i).

Figures 11A, 11B:
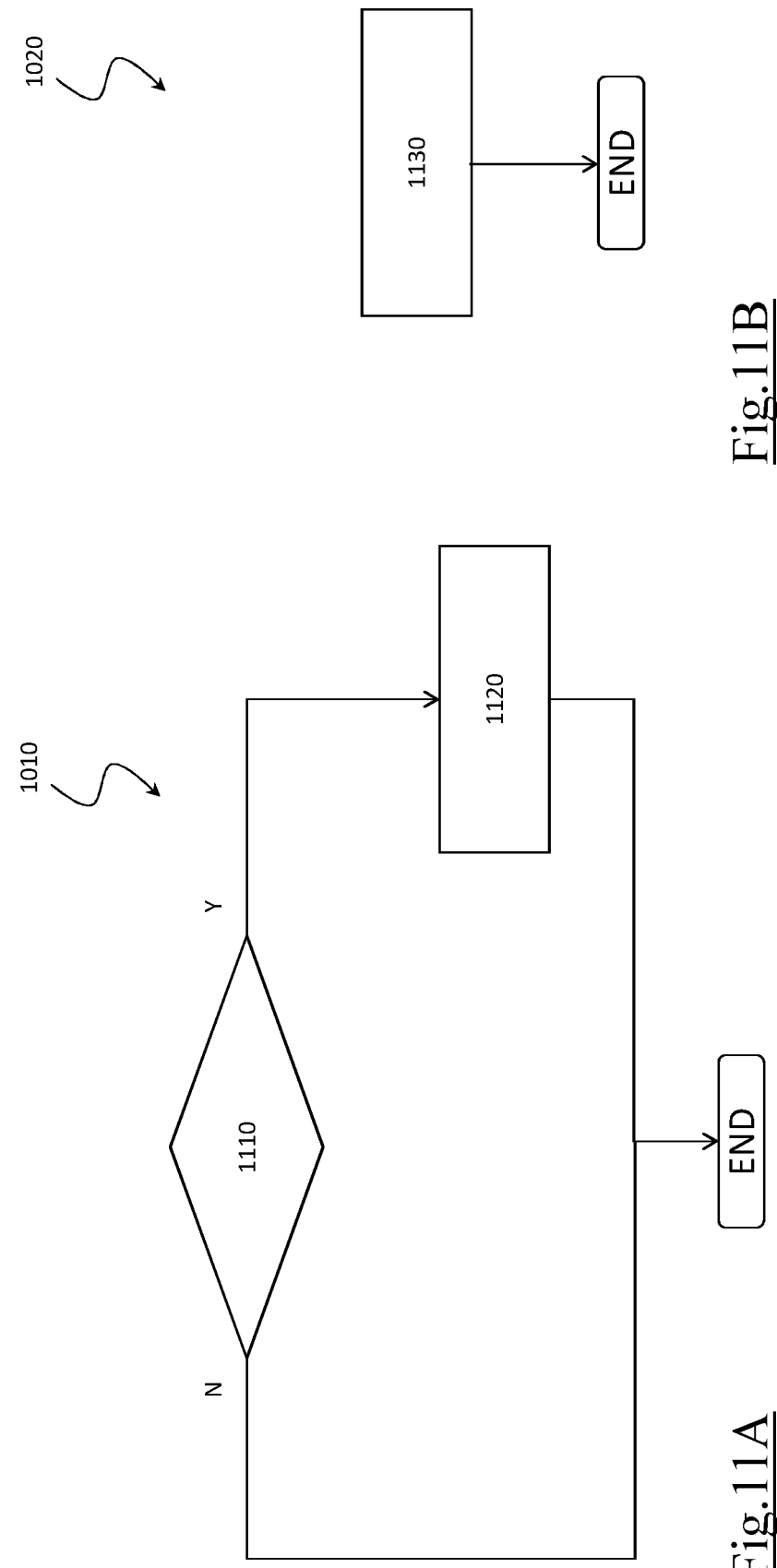
FIGS. 11A-11B are flow charts of operations carried out by the procedures illustrated in FIG. 10.

According to an embodiment of the present invention, the router flight termination procedure 1010 provides for the following operations (illustrated in the flow chart of FIG. 11A and identified with references 1110-1120).

According to an embodiment of the present invention, the router flight termination procedure 1010 provides for checking whether the unmanned autonomous vehicle ID(i) identified by the received flight termination command FTC(ID (i)) is associated to one of the terminator units T(j) associated to the router module R(k) or not (block 1110). According to an embodiment of the present invention, this operation is carried out by checking whether the identifier ID(i) of the unmanned autonomous vehicle ID(i) included in the received flight termination command FTC(ID(i)) is listed in the router table RT(k) of the router module R(k) or not.

According to an embodiment of the present invention, if the identifier ID(i) is not included in the router table RT(k) of the router module R(k) (exit branch N of block 1110), it means that the unmanned autonomous vehicle ID(i) whose flight is to be terminated is not located inside the termination area TA(k) of the router module R(k), and therefore the router module R(k) does not forward the received flight termination command FTC(ID(i)) to any of the terminator units T(j) associated thereto.

According to an embodiment of the present invention, if the identifier ID(i) is included in the router table RT(k) of the router module R(k) (exit branch Y of block 1110), it means that the unmanned autonomous vehicle ID(i) whose flight is to be terminated is located inside the termination area TA(k) of the router module R(k). In this case, according to an embodiment of the present invention, the router flight termination procedure 1010 provides for forwarding the received flight termination command FTC(ID(i)) to all the terminator units T(j) which are listed in the router table RT(k) as being associated to the unmanned autonomous vehicle ID(i) having the same identifier ID(i) as the one included in the flight termination command FTC(ID(i)) (operation 1120).

Returning back to FIG. 10, according to an embodiment of the present invention, the operation F(4) provides for having the terminator unit T(j) execute a terminator flight termination procedure 1020 upon the reception of a flight termination command FTC(ID(i)) from the router module R(k) the terminator unit T(j) is associated to.

According to an embodiment of the present invention illustrated in the flow chart of FIG. 11B, the terminator flight termination procedure 1020 provides for broadcasting the flight termination command FTC(ID(i)) within its coverage area CA(j) (block 1130).

According to an embodiment of the present invention, once an unmanned autonomous vehicle ID(i) executes a flight termination procedure to terminate its flight in response to the reception of a flight termination command FTC(ID(i)) containing its identifier ID(i), the unmanned autonomous vehicle ID(i) is disassociated from the terminator unit(s) T(j) it was previously associated to, because it does not respond to interrogation messages IDOT(ID(i)) coming from the terminator unit(s) T(j) within the time out period TO set by the timer procedure 440(*i*) executed on the terminator unit(s) T(j) (see FIG. 5D).

Figure 12:
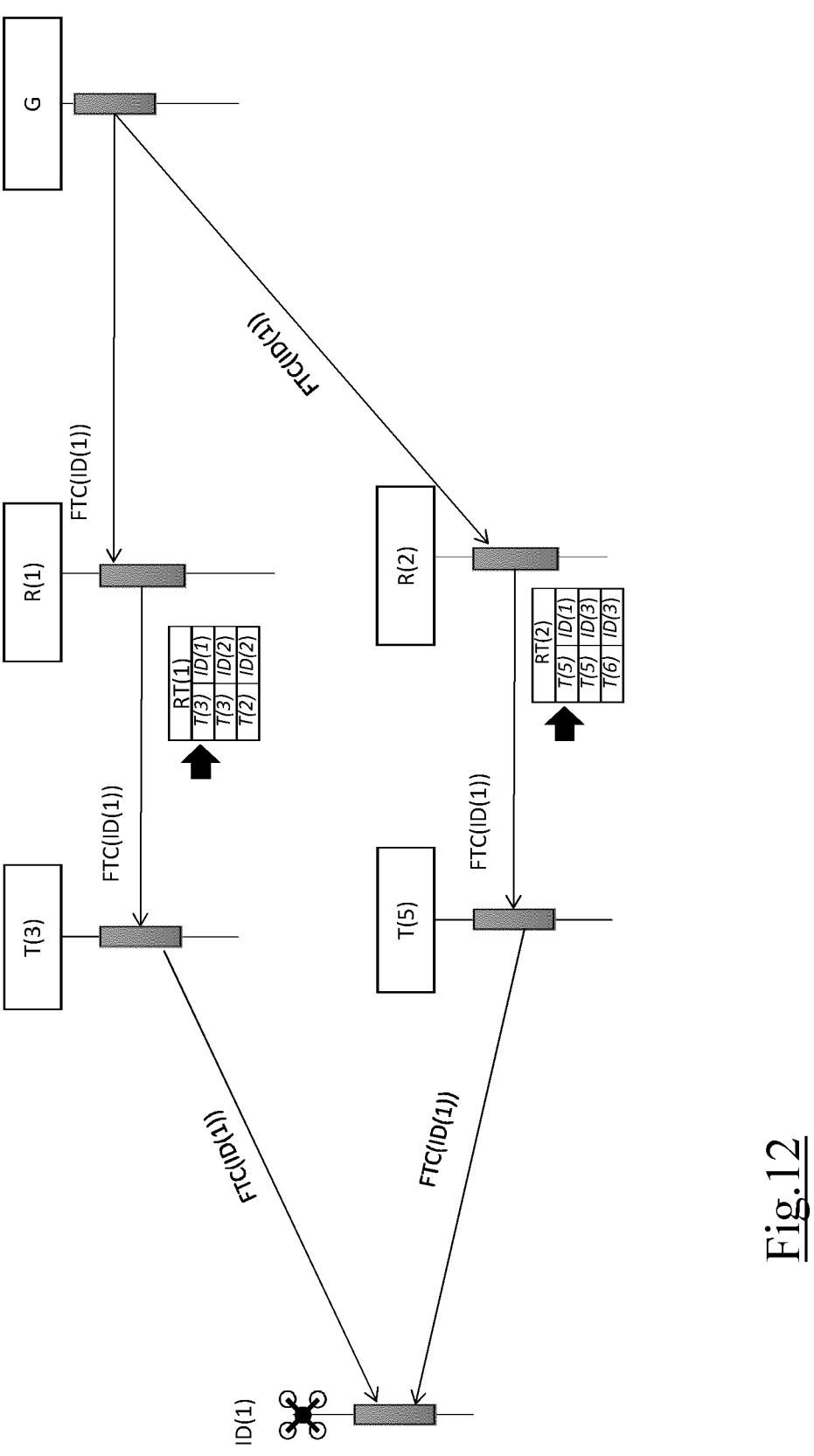
FIG. 12 shows exchange of messages carried out during an exemplary flight termination triggering procedure according to an embodiment of the present invention

FIG. 12 shows the exchange of messages between the gateway module G, the router modules R(1), R(2), the terminator units T(3), T(5), and the unmanned autonomous vehicle ID(1) of FIG. 9 during an exemplary flight termination triggering procedure directed to terminate the flight of the unmanned autonomous vehicle ID(1), which is located at the intersection of the termination areas TA(1) and TA(2), within the coverage area CA(3) of the terminator unit T(3) and at the same time within the coverage area CA(5) of the terminator unit T(5).

In the above described embodiments, the terminator network 200 has a multilevel structure, including one or more gateway modules G, one or more router modules R(k) and terminator units T(j). The invention, however, applies also to terminator networks having a different structure.

For example, according to a different embodiment, the function of the router modules R(k) can be implemented at the gateway module(s) site(s). In this embodiment, each terminator unit T(j) is connected directly to a gateway module G, that routes the commands, messages and data to and from the terminator unit T(j).

According to a still different embodiment, the router function is implemented at the site of each of, or of some of, the terminator units T(j). In this case, the terminator units T(j) work together as an ad-hoc network, where each one of, or some of, the terminator units T(j), as part of the second communication link CH2, interconnects with other terminator units T(j), to form a link to the gateway module G, at the same time acting to route commands, messages and data to/from the source/destination terminator unit T(j).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A system, comprising:
an automatic drive system connected to a communication network and configured to drive flying unmanned autonomous vehicles by exchanging messages and commands with the unmanned autonomous vehicles exploiting a communication link between the communication network and the unmanned autonomous vehicles; and
a terminator network different from the communication network, the terminator network comprising a plurality of terminators, different than the automatic drive system, deployed across a geographic area, each terminator being configured to exchange messages and commands with unmanned autonomous vehicles located in a respective coverage area within the geographic area through a first additional communication link, each terminator being configured to send flight termination commands to selected unmanned autonomous vehicles through the first additional communication link, each unmanned autonomous vehicle being configured to carry out a flight termination procedure in response to reception of the flight termination commands, the first additional communication link being different from the communication link, wherein:
the plurality of terminators are configured to exchange the messages and commands with the communication network through a second additional communication link different from the communication link,
the flight termination commands are generated by at least one of the automatic drive system or user equipment connected to the communication network, wherein the flight termination commands are forwarded to selected terminators using the second additional communication link, and
each of the plurality of terminators stores a corresponding terminator table that indicates one or more unmanned autonomous vehicles that are associated with a corresponding terminator, wherein an architecture of the corresponding terminator table comprises a column, listing, in an initial cell, an identifier of the corresponding terminator table, and in each of a plurality of cells below the initial cell, an identifier of an unmanned autonomous vehicle of the one or more unmanned autonomous vehicles that are associated with the corresponding terminator.

2. The system of claim 1, further comprising:
at least one router in communication relationship with the automatic drive system and the plurality of terminators, the second additional communication link being implemented at least by the at least one router.

3. The system of claim 1, wherein the terminator network is configured to associate unmanned autonomous vehicles to terminators, each terminator being configured to send the flight termination commands to selected unmanned autonomous vehicles within its coverage area which are associated to the terminator.

4. The system of claim 3, wherein the terminator network is configured to associate an unmanned autonomous vehicle to a terminator conditioned to receive by the terminator of an acknowledge message generated by the unmanned autonomous vehicle in response to transmitting, by the terminator, of an interrogation message corresponding to the unmanned autonomous vehicle, the acknowledge message and the interrogation message being exchanged through the first additional communication link.

5. The system of claim 1, wherein the communication link comprises a cellular communication link or a Wi-Fi communication link.

6. The system of claim 5,
wherein the plurality of terminators are configured to exchange the messages and commands with the communication network through a second additional communication link different from the communication link, and
wherein the second additional communication link comprises a wireless communication link or a wired communication link, using at least one of frequencies, technologies or transmission parameters different from the first additional communication link.

7. The system of claim 1, wherein the first additional communication link is a wireless communication link using at least one of frequencies, technologies or transmission parameters different from the communication link.

8. The system of claim 1, wherein each terminator is configured to switch its operation from:
a reduced power mode, in which the exchange of the messages and commands between the terminator and the unmanned autonomous vehicles through the first additional communication link is not enabled, to
an active power mode, in which the exchange of the messages and commands between the terminator and the unmanned autonomous vehicles through the first additional communication link is enabled,
upon receiving a switch-on message.

9. The system of claim 1, wherein a gateway is coupled to the automatic drive system, and wherein a router is connected between the gateway and the terminators, wherein the router:
maintains associations between the unmanned autonomous vehicles and the terminators, wherein the associations are identified based on locations of the unmanned autonomous vehicles with respect to the coverage areas of the terminators, and
routes the messages and commands between the terminators and the gateway.

10. The system of claim 1, wherein the terminator network generates terminator status data indicating a status of the terminators, wherein the terminator status data indicates one or more of:
unmanned autonomous vehicles associated with each terminator,
graphical position of each terminator,
extension of a corresponding coverage area, or
a battery level.

11. A method, comprising:
flying, by an automatic drive system connected to a communication network, unmanned autonomous vehicles by exchanging messages and commands with the unmanned autonomous vehicles exploiting a communication link between the communication network and the unmanned autonomous vehicles;
exchanging, by a terminator of a terminator network, the terminator network being both different from the communication network, and comprising a plurality of terminators, different than the automatic drive system, deployed across a geographic area, messages and commands with the unmanned autonomous vehicles located in a respective coverage area within the geographic area through a first additional communication link, the exchanged messages and commands comprising sending flight termination commands to selected unmanned autonomous vehicles through the first additional communication link; and
executing, by an unmanned autonomous vehicle, a flight termination procedure in response to receiving a termination command, wherein:
the first additional communication link is different from the communication link, the plurality of terminators exchange messages and commands with the communication network through a second additional communication link, different from the communication link,
user equipment connected to the communication network generates the flight termination commands and forwards the generated flight termination commands to selected terminators using the second additional communication link, and
each of the plurality of terminators stores a corresponding terminator table that indicates one or more unmanned autonomous vehicles that are associated with a corresponding terminator, wherein an architecture of the corresponding terminator table comprises a column, listing, in an initial cell, an identifier of the corresponding terminator table, and in each of a plurality of cells below the initial cell, an identifier of an unmanned autonomous vehicle of the one or more unmanned autonomous vehicles that are associated with the corresponding terminator.

12. The method of claim 11, further comprising having a terminator:
associating, by a terminator, the unmanned autonomous vehicles thereto,
sending, by the terminator, the flight termination commands to selected unmanned autonomous vehicles within a coverage area which are associated to the terminator.

13. The method of claim 12, further comprising:
transmitting, by a terminal unit, to the unmanned autonomous vehicle an interrogation message corresponding to the unmanned autonomous vehicle through the first additional communication link;
generating, by the unmanned autonomous vehicle, an acknowledge message in response to the interrogation message;
having the unmanned autonomous vehicle transmitting, by the unmanned autonomous vehicle the acknowledge message to the terminator through the first additional communication link; and
associating, by the terminal unit, the unmanned autonomous vehicle to the terminator conditioned to receive the acknowledge message.

14. A system, comprising:
an automatic drive system connected to a communication network and configured to drive flying unmanned autonomous vehicles by exchanging messages and commands with the unmanned autonomous vehicles exploiting a communication link between the communication network and the unmanned autonomous vehicles; and
a terminator network different from the communication network, the terminator network comprising a plurality of terminators, different than the automatic drive system, deployed across a geographic area, each terminator being configured to exchange messages and commands with unmanned autonomous vehicles located in a respective coverage area within the geographic area through a first additional communication link, each terminator being configured to send flight termination commands to selected unmanned autonomous vehicles through the first additional communication link, each unmanned autonomous vehicle being configured to carry out a flight termination procedure in response to the reception of the flight termination commands, the first additional communication link being different from the communication link, wherein:

the plurality of terminators are configured to exchange the messages and commands with the communication network through a second additional communication link different from the communication link, the flight termination commands are generated by user equipment connected to the communication network, wherein the flight termination commands are forwarded to selected terminators using the second additional communication link, and each of the plurality of terminators stores a corresponding terminator table that indicates one or more unmanned autonomous vehicles that are associated with a corresponding terminator, wherein an architecture of the corresponding terminator table comprises a column, listing, in an initial cell, an identifier of the corresponding terminator table, and in each of a plurality of cells below the initial cell, an identifier of an unmanned autonomous vehicle of the one or more unmanned autonomous vehicles that are associated with the corresponding terminator.

15. The system of claim 14, further comprising:

at least one router in communication relationship with the automatic drive system and the plurality of terminators, the second additional communication link being implemented at least by the at least one router.

16. The system of claim 14, wherein the terminator network is configured to associate unmanned autonomous vehicles to terminators, each terminator being configured to send the flight termination commands to selected unmanned autonomous vehicles within its coverage area which are associated to the terminator.

17. The system of claim 16, wherein the terminator network is configured to associate an unmanned autonomous vehicle to a terminator conditioned to receive by the terminator of an acknowledge message generated by the unmanned autonomous vehicle in response to transmitting, by the terminator, of an interrogation message corresponding to the unmanned autonomous vehicle, the acknowledge message and the interrogation message being exchanged through the first additional communication link.

* * * * *